United States Patent
Yeri

(10) Patent No.: US 12,216,742 B2
(45) Date of Patent: Feb. 4, 2025

(54) GENERATIVE ARTIFICIAL INTELLIGENCE FOR GENERATING PREDICTED EFFECTS IN RESPONSE TO A SYNTHETIC STIMULUS

(71) Applicant: Wells Fargo Bank, N.A., San Francisco, CA (US)

(72) Inventor: Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/330,896

(22) Filed: Jun. 7, 2023

(65) Prior Publication Data
US 2024/0411838 A1    Dec. 12, 2024

(51) Int. Cl.
G06F 18/23    (2023.01)
G06F 18/2413    (2023.01)

(52) U.S. Cl.
CPC ........ *G06F 18/24137* (2023.01); *G06F 18/23* (2023.01)

(58) Field of Classification Search
CPC .................................................... G06Q 30/02
See application file for complete search history.

(56) References Cited

U.S. PATENT DOCUMENTS

| | | | |
|---|---|---|---|
| 2016/0364467 A1* | 12/2016 | Gupta | G06F 16/285 |
| 2018/0034700 A1* | 2/2018 | Singh | H04L 67/535 |
| 2018/0211270 A1* | 7/2018 | Wu | G06Q 30/0269 |
| 2018/0288063 A1* | 10/2018 | Koottayi | G06F 21/50 |
| 2019/0378050 A1 | 12/2019 | Edkin | |
| 2021/0232706 A1 | 7/2021 | Peruski | |
| 2021/0374756 A1 | 12/2021 | Pandey | |

* cited by examiner

*Primary Examiner* — Allen S Lin
(74) *Attorney, Agent, or Firm* — K&L Gates LLP

(57) ABSTRACT

Systems, apparatuses, methods, and computer program products are disclosed for generating a predicted effect for a target cluster in response to a synthetic stimulus. An example method includes receiving a synthetic behavior prediction request and generating a plurality of clusters, wherein each cluster is associated with a corresponding centroid position. The method further includes selecting the target cluster from the plurality of clusters and generating the predicted effect for the target cluster in response to the synthetic stimulus based on the centroid position corresponding to the target cluster. The method further includes providing a predicted effect notification.

20 Claims, 14 Drawing Sheets

GENERATIVE ARTIFICIAL INTELLIGENCE FOR GENERATING PREDICTED EFFECTS IN RESPONSE TO A SYNTHETIC STIMULUS

BACKGROUND

User data may provide useful insights into user behaviour, such as determinations of a cause-and-effect relationship between external events and user response. Additionally, users that exhibit similar behaviours may be grouped together and this aggregation of user data may provide additional insights.

BRIEF SUMMARY

As described above, analysis of user behavior or grouped user behavior may provide helpful insights, such as determinations of a cause-and-effect relationship between external events and user response. Traditionally, artificial intelligence algorithms and/or machine learning models have been used for these types of analysis on existing data. These analyses therefore provide useful insights into user attitudes to a variety of events and allows entities to make data-driven decisions for these users. However, these conventional models and techniques are limited to analysis of existing user data and therefore only allow for retroactive actions to be taken for these users.

In contrast to these conventional techniques for analyzing user behavior which only allows for a post-mortem analysis regarding cause-effect relationships, example embodiments described herein allow for a proactive analysis on existing and/or synthetic data to determine a predicted effect on a user and/or group of users in response to a synthetic stimulus. Embodiments described herein advantageously leverage existing user data to generate a predicted effect for a user in response to a synthetic stimulus for which the user has not experienced. As such, proactive measures may be taken for a user or group of users based on the predicted effect associated with the user or group of users, respectively. Additionally, secondary effects which are caused by the predicted effect may also be determined for additional users or additional groups of users. As such, embodiments described herein further allow for the capture of potential cascading effects on other users or groups of users which are precipitated by the predicted effect. This allows for a more robust determination of the impact of a single event, such that proactive actions taken in response to the predicted effect may not only be responsive to a user or group of users of interest, but also to far-reaching chain of events for other users who are not directly linked to the synthetic event.

In some embodiments, a predictive analytics system may generate a predicted effect for a single target user in response to a synthetic stimulus. In particular, data associated with a digital twin of the user may be leveraged and used to infer a predicted response to a synthetic stimulus for the target user. In some embodiments, the digital twin of the user is a real-world user who is associated with similar features and/or characteristics, such as behavior patterns, to the target use. In an instance in which the digital twin of the user is determined to be associated with a real stimulus that corresponds to the synthetic stimulus, an inferred effect for the digital twin may be determined and the predicted effect for the target user in response to the synthetic stimulus may be determined based on the inferred effect determined for the digital twin. In particular, a stimulus prediction machine learning model may update a user feature set associated with the target user based on an analysis of a feature set of the digital twin. In some embodiments, the stimulus prediction machine learning model may then classify target user into one or more predicted effect categories based on the updated feature set and/or a change in one or more feature values associated with the target user. The predicted effect for the target user may then be determined based on the predicted effect category determined for the target user. Advantageously, the identification and use of a digital twin that is similar to target user and has experienced a stimulus corresponding to the synthetic stimulus may provide real-world insights into user behavior and furthermore, may be less computationally expensive by leveraging existing user data.

In some embodiments, the predictive analysis system may determine other real users are not sufficiently similar to the target user such that a real world user to serve as the digital twin for the target user cannot be determined. Alternatively, in some embodiments, the predictive analysis system may determine that an identified digital twin of the user is not associated with a real stimulus that corresponds to the synthetic stimulus. In such instances, the predictive analysis system may advantageously generate a synthetic user that is similar to the target user using a synthetic user generation machine learning model, which may serve as the digital twin for the target user. The predictive analysis system may then generate a predicted effect for the synthetic user in response to the synthetic stimulus using a behavior prediction machine learning model. Advantageously, the generation and use of a synthetic user may allow for the predictive analysis system to still generate an accurate predicted effect for the target user in instances in which sufficiently similar user data is unavailable or unknown. Additionally, in some embodiments, because the predictive analysis system generates the synthetic user, the predictive analysis system may reduce its overall computational burden by controlling and/ or limiting the number of features included in a feature set associated with the synthetic user. This may allow for a reduction in computational resources expended to generate the predicted effect for the synthetic user.

In some embodiments, the predictive analysis system may also generate a predicted secondary effect for one or more secondary users based on the predicted effect for the target user. In some embodiments, the predictive analysis system may generate one or more clusters based on a feature set associated with the target user and feature sets associated with one or more secondary users. The predictive analysis system may determine a similarity between the target user and one or more secondary users and utilize this inferred similarity to predict a predicted secondary effect for the secondary user. As such, the predictive analysis system may predict far-reaching effects for additional users for which the predicted effect for the target user was the catalyst.

In some embodiments, the predictive analysis system may additionally or alternatively determine a predicted effect in response to a synthetic stimulus for a target cluster (e.g., group of users and/or synthetic users). In this way, the predictive analysis system may gain insights into group behavior rather than just an individual user behavior. To accomplish this, the predictive analysis system may generate a plurality of clusters, which may each include one or more users, and determine a centroid position for each cluster. The centroid position may be representative of the group of users included within the cluster and may be used to generate a prediction for the cluster and users within the cluster without having to individually consider each user in the cluster. As such, this may allow the predictive analysis system to reduce the dimensionality of features considered to determine a predicted effect of a cluster and thereby, reduce the computational burden of the predictive analysis system while still maintaining prediction accuracy.

The predictive analysis system may use a cluster stimulus prediction machine learning model to determine the predicted effect for the target cluster based on an updated centroid position associated with the target cluster. As such, the predictive analysis system may reduce the computational burden associated with evaluating a group effect, which may require evaluating an effect of a synthetic stimulus for each user individually and then evaluating an overall group effect. To this end, the predictive analysis system advantageously determines a centroid feature set for the target cluster as representative for the cluster/group and determines the predicted effect for the target cluster in response to the synthetic stimulus using the centroid feature set.

Similarly, to the individual user evaluations, in some embodiments, the predictive analysis system may also generate a predicted secondary effect for one or more secondary clusters based on the predicted effect for the target cluster. In some embodiments, the predictive analysis system may determine a similarity between the target cluster and one or more secondary clusters and utilize this inferred similarity to generate a predicted secondary effect for the secondary cluster. As such, the predictive analysis system may predict far-reaching effects for additional clusters for which the predicted effect for the target cluster was the catalyst.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
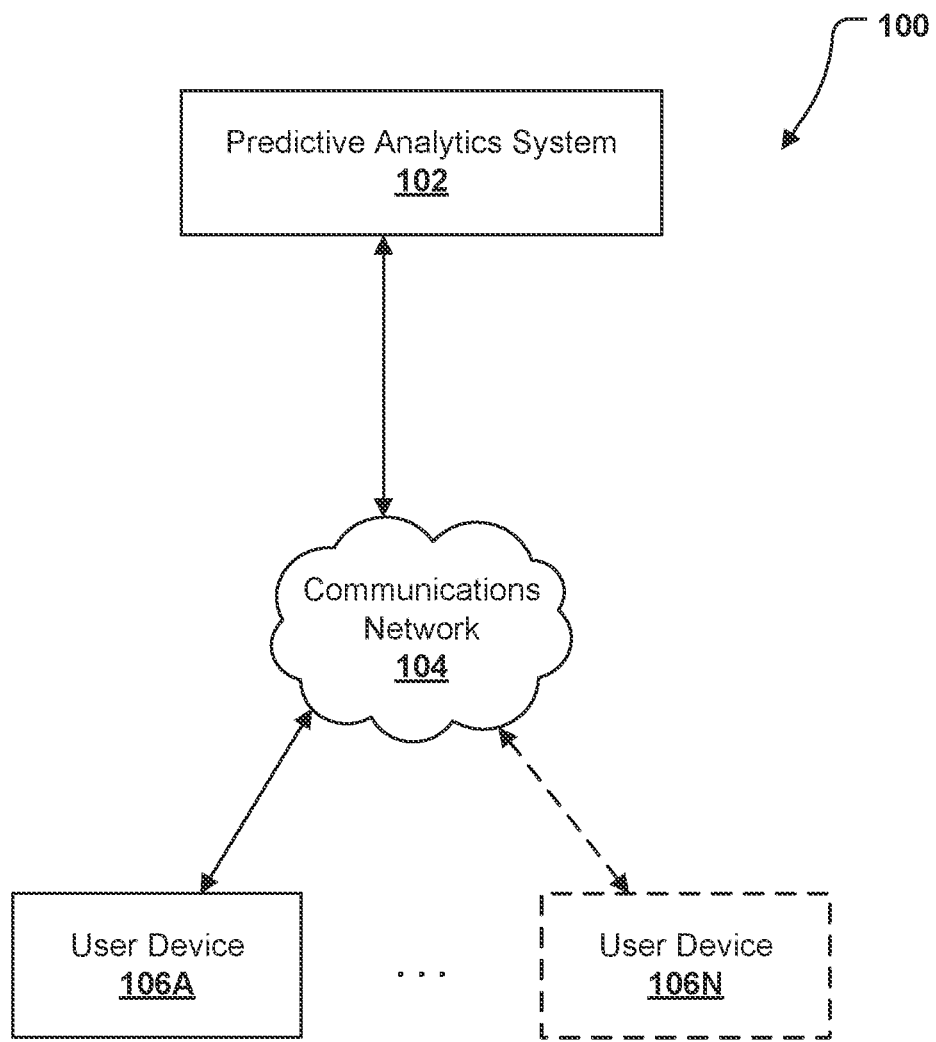
FIG. 1 illustrates a system in which some example embodiments may be used generate a predicted effect for a target user and/or a target cluster in response to a synthetic stimulus.

Example embodiments described herein may be implemented using any of a variety of computing devices or servers. To this end, FIG. 1 illustrates an example environment 100 within which various embodiments may operate. As illustrated, a predictive analytics system 102 may receive and/or transmit information via communications network 104 (e.g., the Internet) with any number of other devices, such as one or more of user devices 106A-106N.

The predictive analytics system 102 may be implemented as one or more computing devices or servers, which may be composed of a series of components. Particular components of the predictive analytics system 102 are described in greater detail below with reference to apparatus 200 in connection with FIG. 2.

In some embodiments, the predictive analytics system 102 may further include a storage device that comprises a distinct component from other components of the predictive analytics system 102. The storage device may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). The storage device may host the software executed to operate the predictive analytics system 102. The storage device may store information relied upon during operation of the predictive analytics system 102, such as various user data, machine learning models, or other algorithms that may be used by the predictive analytics system 102, data and documents to be analyzed using the predictive analytics system 102, or the like. In addition, the storage device may store control signals, device characteristics, and access credentials enabling interaction between the predictive analytics system 102 and one or more of the user devices 106A-106N.

The one or more user devices 106A-106N may be embodied by any computing devices known in the art. The one or more user devices 106A-106N need not themselves be independent devices, but may be peripheral devices communicatively coupled to other computing devices.

Example Implementing Apparatuses

Figure 2:
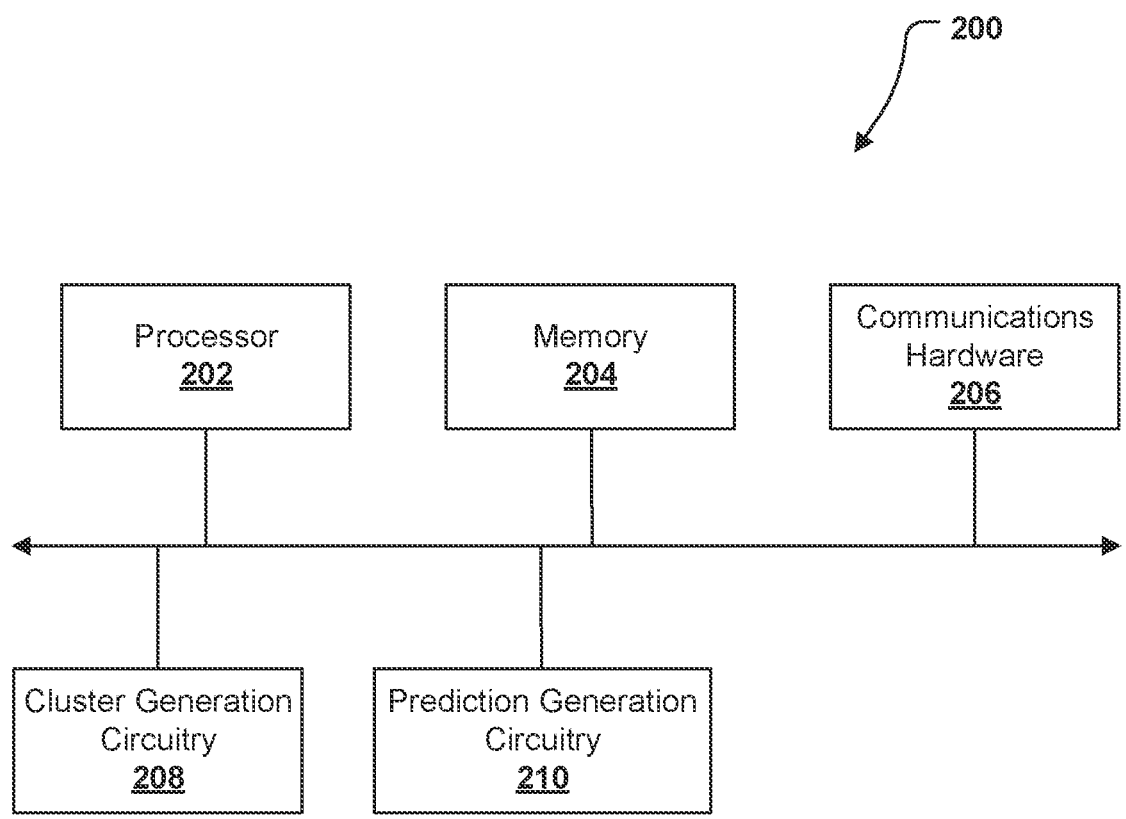
FIG. 2 illustrates a schematic block diagram of example circuitry embodying a system device that may perform various operations in accordance with some example embodiments described herein.

The predictive analytics system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-12. As illustrated in FIG. 2, the apparatus 200 may include processor 202, memory 204, communications hardware 206, cluster generation circuitry 208, and prediction generation circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a cluster generation circuitry 208 that is configured identify a cluster for the target user, identify a digital twin for the target user, generate a similarity score for one or more candidate digital twins, determine the candidate digital twin associated with the optimal similarity score, determine whether the optimal similarity score satisfies a similarity score threshold, generate a synthetic user, identify a cluster for the digital twin, and/or the like. In some embodiments, the cluster generation circuitry 208 may further be configured to determine a plurality of clusters, update a centroid feature set, generate a plurality of synthetic users, identify a synthetic user subset that includes users included in a cluster, determine a centroid position, determine an updated centroid position, and/or the like. The cluster generation circuitry 208 may utilize processor 202, memory 204, or any other hardware component included in the apparatus 200 to perform these operations, as described in connection with FIGS. 3-12 below. The cluster generation circuitry 208 may further utilize communications hardware 206 to gather data from a variety of sources (e.g., user devices 106A-106N as shown in FIG. 1 or a storage device), and/or exchange data with a user.

In addition, the apparatus 200 further comprises a prediction generation circuitry 210 that is configured to generate a predicted effect for a target user, determine whether a digital twin is associated with a stimulus that corresponds to the synthetic stimulus, determine an inferred effect for a digital twin, determine a predicted effect for a digital twin, determine predicted secondary effect for additional users, update feature sets, classify a target user into a predicted effect category, or the like. In some embodiments, the prediction generation circuitry 210 may further be configured to select a target cluster, generate a predicted effect for the target cluster, generate predicted secondary effects for secondary clusters, update centroid feature sets, classify target clusters, or the like. The prediction generation circuitry 210 may utilize processor 202, memory 204, or any other hardware component included in the apparatus 200 to perform these operations, as described in connection with FIGS. 3-12 below. The prediction generation circuitry 210 may further utilize communications hardware 206 to gather data from a variety of sources (e.g., user devices 106A-106N as shown in FIG. 1 or a storage device), and/or exchange data with a user.

Although components 202-210 are described in part using functional language, it will be understood that the particular implementations necessarily include the use of particular hardware. It should also be understood that certain of these components 202-210 may include similar or common hardware. For example, the cluster generation circuitry 208 or prediction generation circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the cluster generation circuitry 208 and prediction generation circuitry 210 may leverage processor 202, memory 204, or communications hardware 206 as described above, it will be understood that any of cluster generation circuitry 208 and prediction generation circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that cluster generation circuitry 208 and prediction generation circuitry 210 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces and flowcharts.

Predicted Effect Operations for a Target User

FIGS. 3-8 illustrate example flowcharts that contain example operations implemented by example embodiments described herein. In particular, the example operations shown by FIGS. 3-8 may be performed by the predictive analytics system 102 for a target user. The operations illustrated in FIGS. 3-8 may, for example, be performed by system device of the predictive analytics system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, cluster generation circuitry 208, prediction generation circuitry 210, and/or any combination thereof. It will be understood that user interaction with the predictive analytics system 102 may occur directly via communications hardware 206, or may instead be facilitated by a separate user device 106A-106N as shown in FIG. 1, and which may have similar or equivalent physical componentry facilitating such user interaction.

Figure 3:
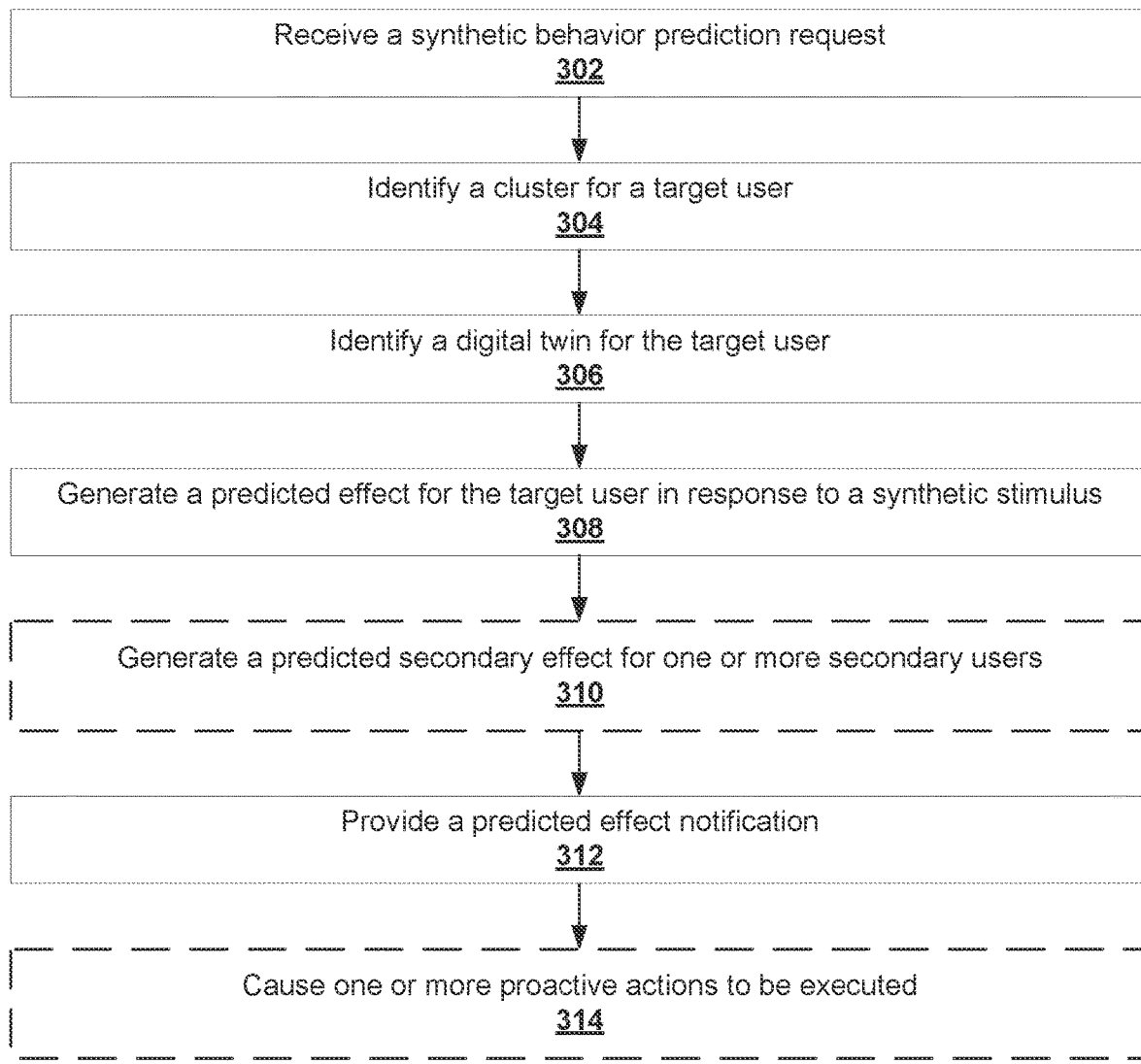
FIG. 3 illustrates an example flowchart for generating a predicted effect for a target user in response to a synthetic stimulus, in accordance with some example embodiments described herein.

Turning first to FIG. 3, example operations are shown for generating a predicted effect for a target user. As described above, the predictive analytics system 102 may generate a predicted effect for a single target user in response to a synthetic stimulus. In some embodiments, data associated with a digital twin of the user may be leveraged and used to infer a predicted response to a synthetic stimulus for the target user. In some embodiments, the digital twin is a real-world user and thus, the identification and use of a digital twin that is similar to target user and has experienced a stimulus corresponding to the synthetic stimulus may provide real-world insights into user behavior and furthermore, may be less computationally expensive by leveraging existing user data. Alternatively, the digital twin may be a synthetically generated user that is similar to the target user, which may allow for the predictive analysis system to still generate an accurate predicted effect for the target user in instances in which sufficiently similar user data is unavailable or unknown. Additionally, in some embodiments, because the predictive analysis system generates the synthetic user, the predictive analysis system may reduce its overall computational burden by controlling and/or limiting the number of features included in a feature set associated with the synthetic user. This, in turn, allows for a reduction in computational resources expended to generate the predicted effect for the synthetic user As shown by operation 302, the apparatus 200 includes means, such as processor 202, memory 204, communications hardware 206, or the like, for receiving a synthetic behavior prediction request. A synthetic behavior prediction request may indicate a request by a user, such as a user associated with the predictive analytics system 102, to determine a predicted effect for a target user in response to a synthetic stimulus. For example, the synthetic behavior prediction request may be received from an institutional employee employed by an institution that operates the predictive analytics system 102. In some embodiments, the requesting user may provide his/her authentication credentials, such as in the synthetic behavior prediction request, and apparatus 200 may authenticate the synthetic behavior prediction request using these provided credentials. In an instance in which the synthetic behavior prediction request is authenticated (e.g., apparatus determines that the requesting user is authorized to perform this request and/or utilize associated data), apparatus 200 may process the synthetic behavior prediction request.

The synthetic behavior prediction request may include an indication of a target user of interest. For example, the synthetic behavior prediction request may include a first name, last name, account identifier, username, email address, phone number, and/or other identifying user information pertaining to the target user. The apparatus 200 may then determine the target user of interest using the provided indication of the target user of interest. In particular, the apparatus 200 may determine a feature set associated with the target user of interest. A feature set for the target user of interest may include one or more features, which may relate to specific characteristics or attributes of the target user. The one or more features may include demographic data (e.g., age, gender, location, occupation, education, etc.), behavioral data (e.g., historical users interactions and associated attributes such as time, date, location, interaction type, etc.), user preferences, purchase history, user device information, social media information, etc. For example, a user feature may relate to a previous user interaction at a merchant. The target user may have purchased particular items on particular day and time and used a particular card to pay for the items.

The synthetic behavior prediction request may also include an indication of a synthetic stimulus. The indication of a synthetic stimulus may describe a particular scenario, condition, or set of conditions of interest. In some embodiments, the indication of a synthetic stimulus may be a text description or an image description. The apparatus 200 may use any suitable method, such as a natural language processing (NLP) model, optical pattern recognition, and/or suitable machine learning models (e.g., convolutional neural networks (CNNs) or neural networks) to generate the synthetic stimulus from the indication of the synthetic stimulus (e.g., the text description or image description). In some embodiments, the indication of a synthetic stimulus may be a selection from a pre-determined set of candidate stimuli. For example, a synthetic stimulus may be providing education on digital payments. As another example, the synthetic stimulus may be a lowering of federal rates to a particular value or relative to the current federal rate. As yet another example, the synthetic stimulus may be interacting with a vendor who only accepts a particular payment type.

As shown by operation 304, the apparatus 200 includes means, such as processor 202, memory 204, communications hardware 206, cluster generation circuitry 208 or the like, for determining a cluster for the target user. Once the apparatus 200 has identified the target user and the associated feature set, the apparatus 200 may user the cluster generation circuitry 208 to identify a cluster for the target user. In some embodiments, the cluster generation circuitry 208 may also receive or otherwise obtain feature sets for a plurality of other users. The plurality of other users may be users who are also associated with the predictive analytics system 102 such that the feature sets for this plurality of users are known or may be obtained. In some embodiments, the plurality of users shares one or more features with the target user. For example, a subset of the plurality of users may correspond to a same age or age group as the target user, another subset of the plurality of users may correspond to a same location as the target user, another subset of the plurality of users may correspond to a similar occupation or income as the target user, etc.

In some embodiments, the cluster generation circuitry 208 may use a clustering model to determine the cluster for the target user. In some embodiments, the clustering model may use one or more clustering techniques and/or algorithms to determine the cluster for the target user and furthermore, for the plurality of users. In particular, the clustering model may use k-means clustering, density-based spatial clustering of applications with noise (DBSCAN) algorithms, spectral clustering, or the like to determine these clusters and the users included in each cluster. In some embodiments, a number of clusters k may be input by a user and included by the synthetic behavior request or alternatively, may be a parameter include in the clustering model. The clustering model may then cluster the target user and the plurality of users into k clusters based on a comparison of similarities between features included in the associated feature sets of these users. Users that are associated with features are determined to be similar to one another may be located more closely together as compared to users that are associated with features that are determined to be less similar to one another. Users within the same cluster may be determined to be associated with at least one similar feature. As such, the clustering model may determine an optimal grouping for the target user and the plurality of users based on an inferred similarity of features between the users.

As shown by operation 306, the apparatus 200 includes means, such as processor 202, memory 204, communications hardware 206, cluster generation circuitry 208 or the like, for identifying a digital twin for the target user. Once the cluster generation circuitry 208 has determined a cluster for the target user, the cluster generation circuitry 208 may identify a digital twin for the target user. In some embodiments, the cluster generation circuitry 208 may first try to determine whether a real user exists who is sufficiently similar to the target user. In some embodiments, the cluster generation circuitry 208 may identify nearby users using an associated cluster position as determined in operation 304. For example, for users who are adjacent to the target user, and may be determined to be candidate digital twins for the target user, the cluster generation circuitry 208 may evaluate a similarity of these users to the target user. The candidate digital twin who is determined to be the most similar to the target user may be selected as the digital twin for the target user. In an instance no adjacent user is determined to be sufficiently similar to the target user, the cluster generation circuitry 208 may determine to generate a synthetic user to serve as the digital twin for the target user. As such, even in an instance in which no real-world user is sufficiently similar to the target user, the cluster generation circuitry 208 may generate a synthetic user to serve as the digital twin for the target user such that a predicted effect may still be determined for the target user.

Figure 4:
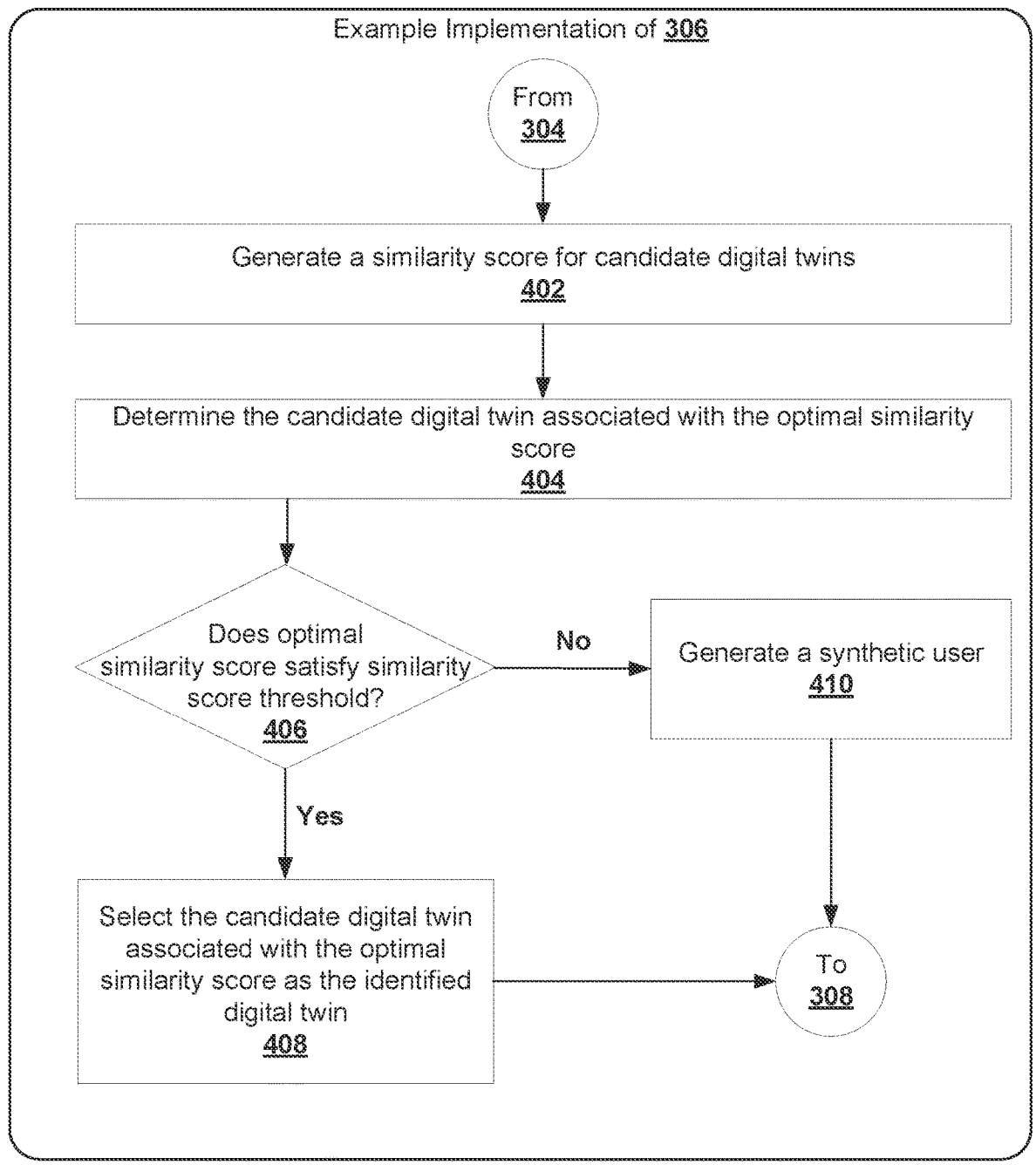
FIG. 4 illustrates an example flowchart for identifying a digital twin for the target user, in accordance with some example embodiments described herein.

In some embodiments, operation 306 may be performed in accordance with the operations described by FIG. 4. Turning now to FIG. 4, example operations are shown for identifying a digital twin for the target user.

As shown by operation 402, the apparatus 200 includes means, such as processor 202, memory 204, communications hardware 206, cluster generation circuitry 208 or the like, for generating a similarity score for candidate digital twins of the target user. As described above, the cluster generation circuitry 208 may identify users who are adjacent to the target user using the cluster position of the users. Adjacent users may also be referred to as candidate digital twins. These candidate digital twins may be within the same cluster as the target user, or may be within a different cluster than the target user. In some embodiments, the cluster generation circuitry may use a k-nearest neighbour (KNN) algorithm to identify a number of candidate digital twins, N, for the target user and may generate a similarity score for each candidate digital twin. In some embodiments, the number of candidate digital twins, N, is a predefined value such that the N closest users to the target user will be identified as candidate digital twins. The cluster generation circuitry 208 may use a distance metric, such as Euclidean distance or Manhattan distance, between a data point corresponding to the target user and a data point corresponding to a candidate digital twin to generate the similarity score for the respective digital twin.

As shown by operation 404, the apparatus 200 includes means, such as processor 202, memory 204, communications hardware 206, cluster generation circuitry 208 or the like, for determining the candidate digital twin associated with the optimal similarity score. Once the cluster generation circuitry 208 has generated a similarity score for each of the N candidate digital twins, the cluster generation circuitry 208 may determine which candidate digital twin is associated with the optimal similarity score. In some embodiments, the optimal similarity score corresponds to the candidate digital twin associated with the shortest distance from the target user.

As shown by operation 406, the apparatus 200 includes means, such as processor 202, memory 204, communications hardware 206, cluster generation circuitry 208 or the like, for determining whether the optimal similarity score satisfies a similarity score threshold. Once the cluster generation circuitry 208 has determined the optimal similarity score, the cluster generation circuitry 208 may determine whether the optimal similarity score satisfies a similarity score threshold. For example, a similarity score threshold may specify be a similarity score value that the optimal similarity score must satisfy (e.g., meet or exceed). That is, a similarity score threshold may be set to determine if adjacent user(s) are sufficiently similar to the target user. It is appreciated that in various examples the particular optimal similarity score may be different in different use cases, and may, at least in part, depend on the particular synthetic behavior prediction request.

In an instance in which the optimal similarity score satisfies a similarity score threshold, the process proceeds to operation 408. As shown by operation 408, the apparatus 200 includes means, such as processor 202, memory 204, communications hardware 206, cluster generation circuitry 208 or the like, for selecting the candidate digital twin associated with the optimal similarity score as the identified digital twin. In an instance in which the optimal similarity score is determined to satisfy the similarity score threshold, the cluster generation circuitry 208 may determine to use the candidate digital twin associated with the optimal similarity score as the digital twin of the target user. In this instance, the cluster generation circuitry 208 may determine that a real-world user is sufficiently similar to the target user and may be used as the digital twin for the target user. Thus, this candidate digital twin and the associated feature set of that candidate digital twin may be identified and used as the digital twin in subsequent operations.

In an instance in which the optimal similarity score fails to satisfy a similarity score threshold (e.g., does not meet or exceed), the process proceeds to operation 410. As shown by operation 410, the apparatus 200 includes means, such as processor 202, memory 204, communications hardware 206, cluster generation circuitry 208 or the like, for generating a synthetic user. In an instance in which the optimal similarity score fails to satisfy the similarity score threshold, the cluster generation circuitry 208 may determine that currently, a real-world user who is sufficiently similar to the target user is not known. As such, the cluster generation circuitry 208 may determine to generate a synthetic user to serve as the digital twin for the target user. In particular, the cluster generation circuitry 208 may use a synthetic user generation machine learning model to generate the synthetic user and associated feature set.

In some embodiments, the synthetic user generation machine learning model may be a data model that is configured to describe parameters, hyper-parameters, and/or stored operations of a machine learning model that is configured to process a feature set associated with the target user and generate a synthetic user and associated feature set. In some embodiments, the synthetic user generation machine learning model may be a generative adversarial network (GAN) that is trained to generate features for the synthetic user that are similar to the features of the target user. In particular, a generator of the synthetic user generation machine learning model may generate candidate feature values for each feature included in the feature set associated with the target user. A discriminator of the synthetic user generation machine learning model may then determine whether the candidate feature value is synthetic or real user data. In an instance in which the discriminator determines a candidate feature value is synthetic, the discriminator rejects the candidate feature value and the generator produces a new candidate feature value until the discriminator determines a candidate feature value is real user data for the feature. In an instance in which the discriminator determines the candidate feature value is real user data, the candidate feature value may be appended as the feature value for the corresponding feature in the feature set for the synthetic user. This indicates that the synthetic feature value generated by the generator may be indistinguishable from real user data and thus, may be used as a feature value for the feature in the feature set for the synthetic user.

In some embodiments, once the synthetic user generation machine learning model has generated a synthetic user, the cluster generation circuitry 208 may determine a similarity score for the synthetic user, similar to operation 402. In some embodiments, a cluster may be determined for the synthetic user and then a similarity score determined for the synthetic user. Additionally, the cluster generation circuitry 208 may determine whether the similarity score determined for the synthetic user satisfies the optimal similarity score, similar to operation 406. In an instance in which the similarity score fails to satisfy the optimal similarity score, the cluster generation circuitry 208 may discard the synthetic user and use the synthetic user generation machine learning model to generate another new synthetic user. This process may be repeated until a synthetic user associated with a similarity score that satisfies the candidate similarity score is generated. In an instance in which the similarity score associated with the synthetic user satisfies the similarity score threshold, the cluster generation circuitry 208 may identify the synthetic user as the digital twin of target user.

Returning now to FIG. 3, as shown by operation 308, the apparatus 200 includes means, such as processor 202, memory 204, communications hardware 206, prediction generation circuitry 210 or the like, for generating a predicted effect for the target user in response to a synthetic stimulus. Once the digital twin for the target user has been identified, the prediction generation circuitry 210 may generate the predicted effect for the target user based on the feature set associated with the digital twin. In some embodiments, in the instance in which the digital twin corresponds to a real-world user, the prediction generation circuitry 210 may determine whether the digital twin is associated with a stimulus that corresponds to the synthetic stimulus. Said otherwise, the prediction generation circuitry 210 may determine whether the digital twin has experienced a stimulus that is similar to the synthetic stimulus described by the synthetic behavior prediction request such that the prediction generation circuitry 210 may leverage known corresponding feature data to determine how the digital twin responded to such a stimulus. In an instance in which the digital twin corresponds to a real-world user, but the digital twin is not associated with a stimulus that corresponds to the synthetic stimulus, the prediction generation circuitry 210 may generate a synthetic user as described in operation 410 of FIG. 4, and use the generated synthetic user as the digital twin for the target user. In an instance in which the digital twin is a synthetic user, the prediction generation circuitry 210 may use a behavior prediction machine learning model to generate a predicted response to the synthetic stimulus for the digital twin and, further, leverage this predicted response to generate a predicted response for the target user.

In some embodiments, the predicted effect for the target user may be associated with an updated user feature set and/or one or more predicted feature changes for the target user. In some embodiments, the prediction generation circuitry 210 may use a stimulus prediction machine learning model to generate the updated user feature set and/or one or more predicted feature changes for the target user in response to the synthetic stimulus. In some embodiments, the stimulus prediction machine learning model is a data model that is configured to describe parameters, hyperparameters, and/or stored operations of a machine learning model that is configured to process the feature set for a target user, the synthetic stimulus, a feature set for the digital twin, and a predicted effect or inferred effect for a digital twin, to generate the updated user feature set, the one or more predicted feature changes, and/or a predicted effect for the target user. In some embodiments, the stimulus prediction machine learning model may be a neural network that is trained to infer correlations and patterns between users (e.g., the target user and digital twin) and to determine a predicted effect for a particular user (e.g., the target user) based on the predicted effect or inferred effect for the other user (e.g., the digital twin). Said otherwise, the stimulus prediction machine learning model may infer changes in feature values and generate an updated feature set for the target user based on inferred changes in feature values and/or an updated feature set for the digital twin.

For example, the digital twin and the target user may share similar values for 8 features out of 10 features, but may have different features values for the remaining 2 out of 10 features. The stimulus prediction machine learning model may determine a similar change in the 8 similar feature values for the target user as the digital twin, but may determine different changes in the 2 dissimilar feature values. As such, the stimulus prediction machine learning model may infer a predicted effect for the target user based on a holistic view of the target user and digital twin by considering the similarities and differences between them. The role of the updated feature set and/or one or more predicted feature changes for the target user in generating the predicted effect for the target user is further described in FIG. 7.

Figure 5:
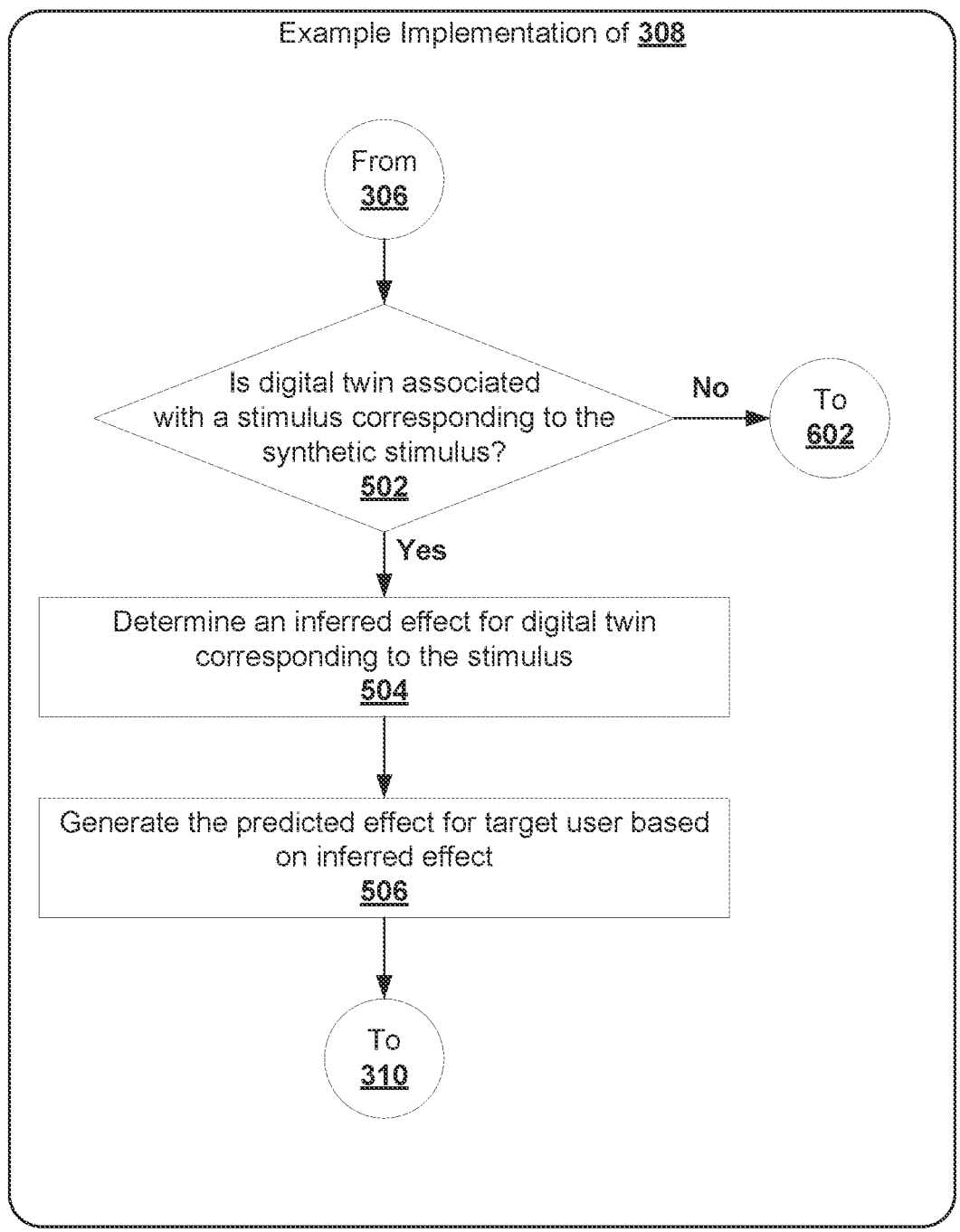
FIG. 5 illustrates an example flowchart for generating a predicted effect for a target user in an instance in which an identified digital twin corresponds to a real user, in accordance with some example embodiments described herein.

In some embodiments, operation 308 may be performed in accordance with the operations described by FIG. 5. Turning now to FIG. 5, example operations are shown for determining a predicted effect for a target user in an instance in which an identified digital twin corresponds to a real user.

As shown by operation 502, the apparatus 200 includes means, such as processor 202, memory 204, communications hardware 206, prediction generation circuitry 210 or the like, for determining whether the digital twin is associated with a stimulus corresponding to the synthetic stimulus. As described above, the prediction generation circuitry 210 may determine whether the digital twin is associated with a stimulus that corresponds to the synthetic stimulus. In particular, the prediction generation circuitry 210 may process the feature set associated with the digital user, and/or user data, to determine whether the digital twin is associated with a stimulus that corresponds to the synthetic stimulus. For example, in an instance in which the synthetic event relates to providing education to the user regarding digital payments, the prediction generation circuitry 210 may analyze the user data associated with the synthetic user to determine whether such a notification was ever provided to the digital twin. As another example, in an instance in which the synthetic event relates to lowering federal rates to a particular value, the prediction generation circuitry 210 may determine a time period for which federal rates were at that particular rate, and then determine whether user data associated with the synthetic user corresponds to this time period.

Figure 6:
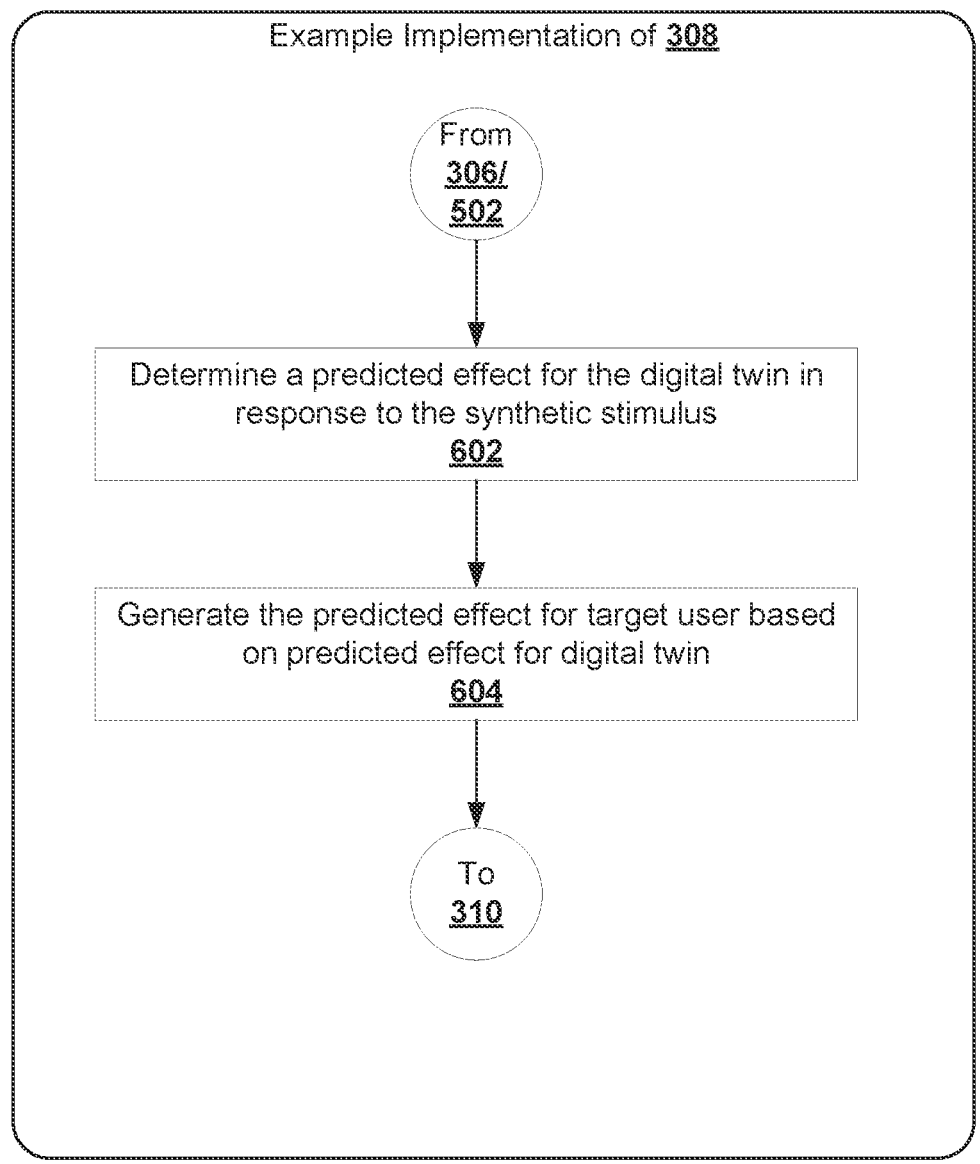
FIG. 6 illustrates an example flowchart for generating a predicted effect for a target user in an instance in which an identified digital twin corresponds to a synthetic user, in accordance with some example embodiments described herein.

In an instance in which the digital twin is determined to not be associated with a stimulus corresponding to the synthetic stimulus, the process proceed to operation 602, which is discussed in greater detail with respect to FIG. 6. In such an instance, the prediction generation circuitry 210 may determine that a real-world user who is sufficiently similar to the target user and has experienced a stimulus corresponding to the synthetic stimulus cannot be found for the target user. As such, the prediction generation circuitry 210 may proceed to generate synthetic user to serve as the digital twin and utilize this synthetic user to generate the predicted effect for the target user, as discussed in greater detail in FIG. 6.

Returning to FIG. 5, in an instance in which the digital twin is determined to be associated with a stimulus that corresponds to the synthetic stimulus, the process proceeds to operation 504. As shown by operation 504, the apparatus 200 includes means, such as processor 202, memory 204, communications hardware 206, prediction generation circuitry 210 or the like, for determining an inferred effect for the digital twin corresponding to the stimulus. Once prediction generation circuitry 210 determines that the digital twin is associated with a stimulus corresponding to the synthetic stimulus, the prediction generation circuitry 210 may determine an inferred effect for the digital twin corresponding to the stimulus. In some embodiments, the inferred effect may be associated with an updated user feature set and/or one or more predicted feature changes for the digital twin. Additionally, the inferred effect may additionally correspond to a particular predicted effect category, as described in more detail with respect to FIG. 7.

In particular, the prediction generation circuitry 210 may use an inference machine learning model to process the stimulus corresponding to the synthetic stimulus and the feature set and/or user data associated with the digital twin. In some embodiments, the inference machine learning model is a data model that is configured to describe parameters, hyper-parameters, and/or stored operations of a machine learning model that is configured to process a feature set or user data for the digital twin and the stimulus to generate an inferred updated user feature set, one or more inferred feature changes, and/or an inferred effect for the digital twin. In some embodiments, the inference machine learning model may be a neural network that is trained to analyze the relationship between an event (e.g., stimulus) and user data to determine the inferred effect for the digital twin. In some embodiments, the inference machine learning model may be configured to select and process only user data within a particular time frame that is based on a timestamp for the stimulus. For example, if the stimulus occurred on a particular date, the inference machine learning model may be configured to process only data that occurred for a period (e.g., one month) before and a period (e.g., three months) after the particular date. As such, the inference machine learning model may control and limit the amount of data considered to determine the inferred effect for the digital twin. In some embodiments, the inference machine learning model may determine an inferred feature change for the one or more features of the feature set associated with the digital twin in response to the stimulus. For example, the inference machine learning model may determine whether a change in a feature value is likely due to the stimulus by comparing a feature value before and after the stimulus. The inference machine learning model may additionally or alternatively determine an updated feature set for the digital twin. In some embodiments, the change in value for the one or more features and/or the updated feature set are determined to be associated with the inferred effect for the digital twin. In some embodiments, the inference machine learning model may further be configured to classify the digital twin into one or more effect categories based on the updated feature set. For example, if the feature for number of card-not-present transactions increased after the stimulus, the digital twin may be categorized into a "digital transaction increase" effect category. The classification of users into event categories is described in more detail with respect to FIG. 7.

As shown by operation 506, the apparatus 200 includes means, such as processor 202, memory 204, communications hardware 206, prediction generation circuitry 210 or the like, for generating a predicted effect for the target user based on the inferred effect. As described above in operation 308, the prediction generation circuitry 210 may use the stimulus prediction generation machine learning model to generate the predicted effected for the target user. Here, the prediction generation circuitry 210 may provide the input feature set for the target user, the synthetic stimulus, a feature set for the digital twin, and the inferred effect for the digital twin to the stimulus prediction machine learning model. The stimulus prediction machine learning model may then generate the predicted effect for the target user based on the inferred effect determined for the digital twin, as described above in operation 308.

In some embodiments, operation 308 may be performed in accordance with the operations described by FIG. 6. Turning now to FIG. 6, example operations are shown for determining a predicted effect for a target user in an instance in which an identified digital twin corresponds to a synthetic user. In some embodiments, the prediction generation circuitry 210 may determine that either a real-world user that is sufficiently similar to the target user does not exist, as described in FIG., 4 or that the real-world user is not associated with a stimulus that corresponds to the synthetic stimulus, as described in FIG. 5. As such, the prediction generation circuitry 210 may generate a synthetic user to be used as the digital twin, and determine a predicted effect for the digital twin, which may then be used to generate the predicted effect for the target user.

As shown by operation 602, the apparatus 200 includes means, such as processor 202, memory 204, communications hardware 206, prediction generation circuitry 210 or the like, for determining a predicted effect for the digital twin in response to the synthetic stimulus. In some embodiments, the prediction generation circuitry 210 may determine a predicted effect for the digital twin in response to the synthetic stimulus, which may be then leveraged to determine the predicted effect for the target user. As described above, the digital twin which corresponds to a synthetic user may be associated with a feature set that includes one or more synthetically generated features. The prediction generation circuitry 210 may provide the feature set for the digital twin and the synthetic stimulus to a behavior prediction machine learning model which may be configured to process the feature set and synthetic stimulus to determine an updated feature set, one or more predicted feature changes for the digital twin, and a predicted effect for the digital twin.

In some embodiments, the behavior prediction machine learning model is a data model that is configured to describe parameters, hyper-parameters, and/or stored operations of a machine learning model that is configured to process the feature set for a digital twin and the synthetic stimulus to generate the updated user feature set, the one or more predicted feature changes, and/or a predicted effect for the digital twin. The behavior prediction machine learning model may be similar to the stimulus prediction machine learning model such that it leverages historical behavior user data to historical stimuli to determine a predicted effect on a user. However, the behavior prediction machine learning model does not determine a correlation between the target user and the digital user and use this correlation to determine the predicted effect for the user. Instead, the behavior prediction machine learning model uses patterns from historical user behavior to other stimulus and an inferred similarity of the stimuli to the synthetic stimulus and user features to the feature set of the digital twin to determine the predicted effect for the digital twin. For example, the behavior prediction machine learning model may weight historical users who have similar features to the digital twin more highly, and effects to stimuli which are similar to the synthetic stimulus relatively higher than other users. The behavior prediction machine learning model may determine an updated user feature set, one or more predicted feature changes, and/or a predicted effect for the digital twin. In some embodiments, the behavior prediction machine learning model may further be configured to classify the digital twin into one or more effect categories based on the updated feature set. For example, if the feature for number of card-not-present transactions increased after the stimulus, the digital twin may be categorized into a "digital transaction increase" effect category. The classification of users into event categories is described in more detail with respect to FIG. 7.

As shown by operation 604, the apparatus 200 includes means, such as processor 202, memory 204, communications hardware 206, prediction generation circuitry 210 or the like, for generating a predicted effect for the target user based on the predicted effect for the digital twin. As described above in operation 308 and operation 506, the prediction generation circuitry 210 may use the stimulus prediction generation machine learning model to generate the predicted effect for the target user. Here, the prediction generation circuitry 210 may provide the input feature set for the target user, the synthetic stimulus, a feature set for the digital twin, and the predicted effect for the digital twin to the stimulus prediction machine learning model. The stimulus prediction machine learning model may then generate the predicted effect for the target user based on the predicted effect determined for the digital twin, as described above in operation 308. Similar to real-world user data, the particular feature values between the target user and digital twin (e.g., the synthetic user) may vary, where some values may be similar while other values are different. As such, the predicted effect for the target user based on a synthetic user as the digital twin is determined similarly to the predicted effect for the target user based on a real-world user as the digital twin.

Figure 7:
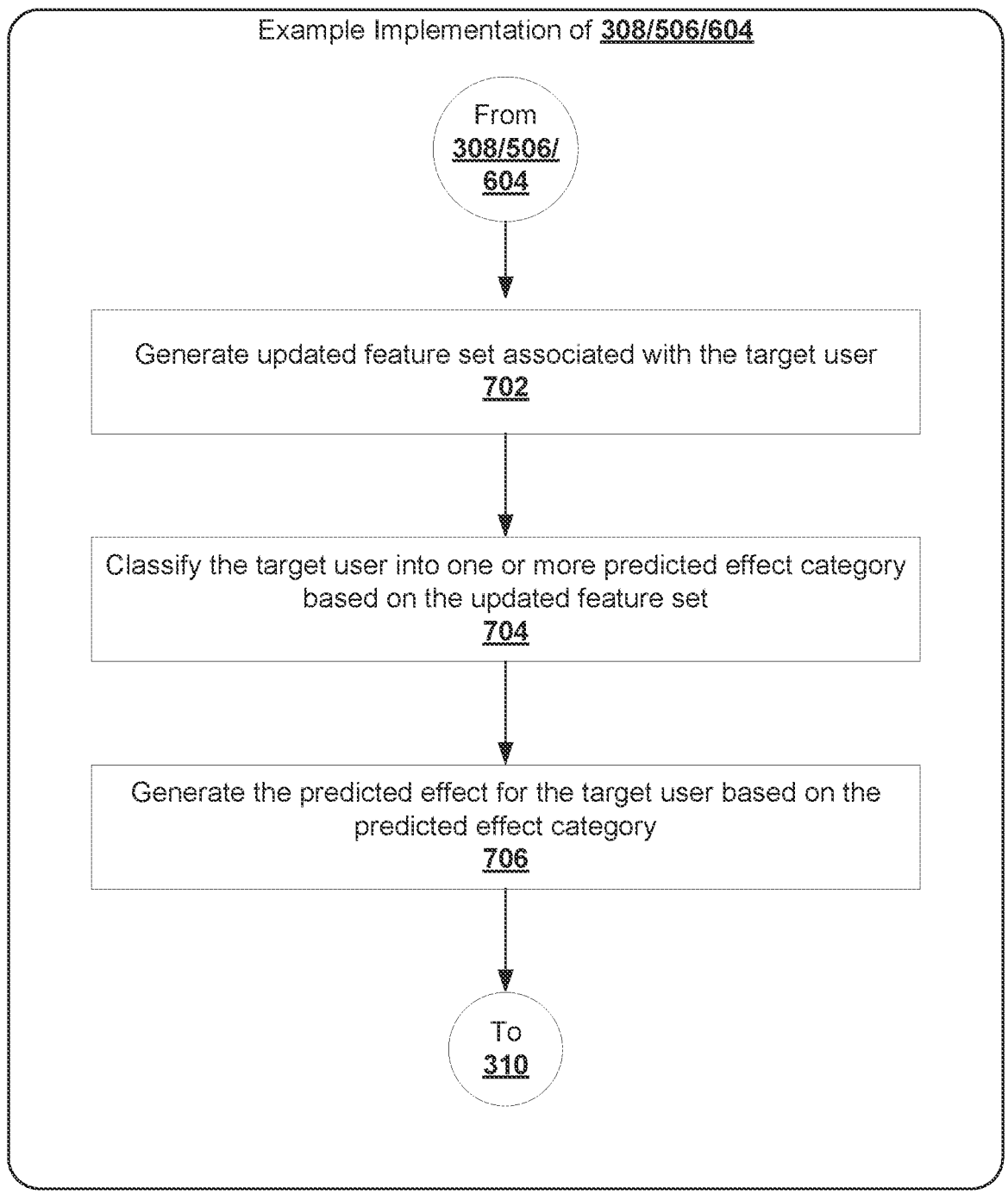
FIG. 7 illustrates an example flowchart for generating the predicted effect for the target user based on a predicted effect category, in accordance with some example embodiments described herein.

In some embodiments, operations 308, 506, and/or 604 may be performed in accordance with the operations described by FIG. 7. Turning now to FIG. 7, example operations are shown for generating a predicted effect for the target user based on a predicted effect category.

As shown by operation 702, the apparatus 200 includes means, such as processor 202, memory 204, communications hardware 206, prediction generation circuitry 210 or the like, for generating an updated feature set associated with the target user. In some embodiments, the stimulus prediction machine learning model may determine one or more predicted feature changes for one or more features of the feature set associated with the target user based on an inferred similarity between the features of the target user and the digital twin. The one or more predicted feature changes may be used to generate the updated feature set, which may include update feature values which have been updated based on an original feature value and an associated predicted feature change. As such, the updated feature set for the target user may reflect predicted changes in feature values of the target user in response to the synthetic stimulus.

As shown by operation 704, the apparatus 200 includes means, such as processor 202, memory 204, communications hardware 206, prediction generation circuitry 210 or the like, for classifying the target user into one or more predicted effect categories based on the updated feature set. In some embodiments, the stimulus prediction model may be configured with a plurality of predicted effect categories. These predicted effect categories may be associated with a set of criteria which the updated feature set and/or predicted updated values need to satisfy in order to qualify for the predicted effect category. Additionally, a predicted effect category may correspond to a particular predicted effect. The stimulus prediction machine learning model may classify the target user into one or more predicted effect categories based on which criteria the target user satisfies based on the associated feature set. For example, a "digital transaction increase" predicted effect category may require that an overall number of digital transactions of the target user increased, as evidenced by the updated feature set and/or predicted updated values. In an instance in which the predicted updated values and/or updated feature set associated with the target user indicate an overall number of digital transactions increased, the stimulus prediction machine learning model may classify the target user into the "digital transaction increase" category, which may be associated with an "increase in digital transaction" predicted effect.

As shown by operation 706, the apparatus 200 includes means, such as processor 202, memory 204, communications hardware 206, prediction generation circuitry 210 or the like, for generating the predicted effect for the target user based on the predicted effect category. As described above, each predicted effect category may be associated with a predicted effect. As such, the stimulus prediction machine learning model may generate the predicted effect for the target user based on which predicted effect categories for which the user satisfied associated criteria (e.g., was classified into) and the associated predicted effect for each of these predicted effect categories.

Although the operations of FIG. 7 described above were described with reference to the stimulus prediction machine learning model, it will be appreciated that the behavior prediction machine learning model and/or inference machine learning model may determine a predicted effect or inferred effect for a digital twin in a similar fashion as the operations described above.

Returning now to FIG. 3, optionally, as shown by operation 310, the apparatus 200 includes means, such as processor 202, memory 204, communications hardware 206, cluster generation circuitry 208, prediction generation circuitry 210, or the like, for generating a predicted secondary effect for one or more additional users. As mentioned above, in some examples, a predicted effect determined for the target user may have far-reaching affects and may affect other secondary users. In some embodiments, the cluster generation circuitry 208 may leverage the clustering determined in operation 304 to identify one or more secondary users of interest and determine one or more secondary effects inferred to be caused by the predicted effect determined for the target user in response to the synthetic stimulus.

In some embodiments, the prediction generation circuitry 210 may use a secondary effect machine learning model to generate a predicted secondary for a secondary user. In some embodiments, the secondary effect machine learning model is a data model that is configured to describe parameters, hyper-parameters, and/or stored operations of a machine learning model that is configured to process a similarity score for the secondary user, a centroid distance shift score for the target user, and a centroid distance score for the secondary user to generate the predicted secondary effect for the secondary user. The secondary effect machine learning model may determine an inferred correlation between a shift of the target user relative to a centroid corresponding to the cluster which includes the target user. In some embodiments, this may be the original cluster that included the user such that even in instances in which the user is no longer included within the original cluster, the centroid of the cluster may still be used to provide a relative shift of the target user. This shift of the target user relative to the centroid of the cluster may be determined to be attributed to the synthetic stimulus. The similarity score determined for the secondary user may be indicative of a similarity between the target user and the secondary user, as previously described in operation 402 of FIG. 4. Additionally, the secondary user may also be associated with a centroid distance (e.g., prior to any secondary effect for the secondary user).

The secondary effect machine learning model may then leverage the inferred similarity between the target user and the secondary user as described by the similarity score to determine a predicted centroid distance shift for the secondary user. For example, if the target user and secondary user are very similar, the secondary effect machine learning model may infer that the secondary user may experience a centroid shift similar to that of the target user. The centroid distance shift may be a particular direction that is relative to the centroid of the cluster (e.g., northwest of the cluster centroid). The secondary effect machine learning model may then determine a relative degree of shift based on the centroid distance shift determined for the secondary user and generate the predicted secondary effect for the secondary user based on this relative degree of shift. For example, if the degree of shift for the user is relatively large, the predicted secondary effect may be generated as "highly affected". Furthermore, the direction of shift may indicate whether the predicted secondary effect corresponds to the predicted effect for the target user (e.g., is the same as) or does not correspond to (e.g., is the opposite of) the predicted effect for the target user. For example, a centroid distance shift for the target user may be northwest, but the predicted centroid distance shift for the secondary user may be southeast, indicating the opposite effect for the secondary user such that the opposite predicted effect is determined for the secondary user as compared to the target user. As such, the secondary effect machine learning model may determine the predicted secondary effect for the secondary user based on the degree of shift of the secondary user relative to a centroid as well as the direction of shift.

Figure 8:
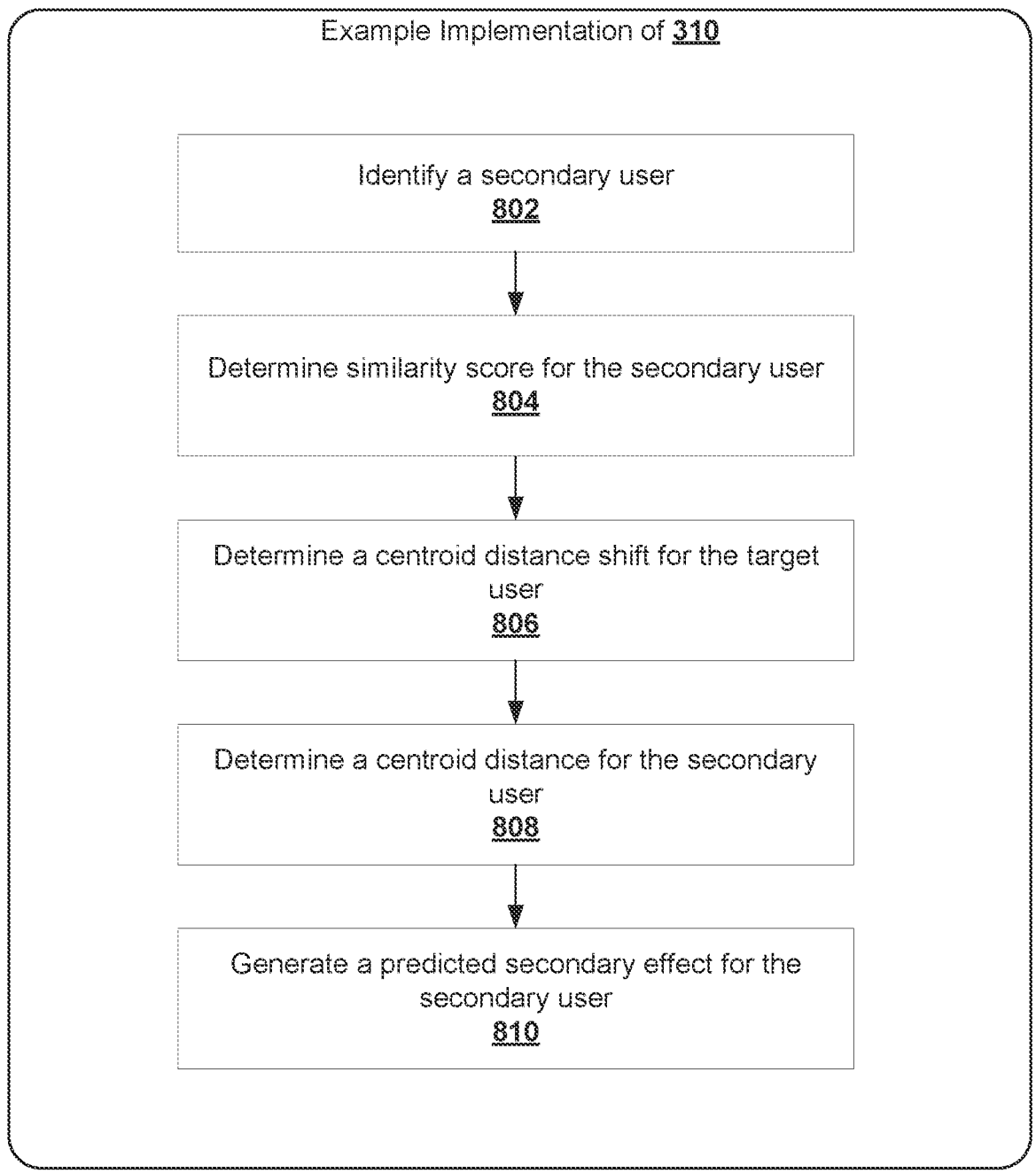
FIG. 8 illustrates an example flowchart for generating a predicted secondary effect for one or more additional users, in accordance with some example embodiments described herein.

In some embodiments, operation 310 may be performed in accordance with the operations described by FIG. 8. Turning now to FIG. 8, example operations are shown for generating a predicted secondary effect for a secondary user. The operations described by FIG. 8 may be repeated for each secondary user included in the one or more secondary users to determine a predicted secondary effect for the corresponding secondary user.

As shown by operation 802, the apparatus 200 includes means, such as processor 202, memory 204, communications hardware 206, cluster generation circuitry 208, or the like, for identifying a secondary user of interest. In some embodiments, each user included in the same cluster as the target user may be identified by the cluster generation circuitry 208 as a secondary user. In some embodiments, any user from any cluster may be identified by the cluster generation circuitry 208 as a secondary user. The cluster generation circuitry 208 may evaluate each identified secondary user in any particular order.

As shown by operation 804, the apparatus 200 includes means, such as processor 202, memory 204, communications hardware 206, cluster generation circuitry 208, or the like, for determining a similarity score for the secondary user. Similar to operation 402 of FIG. 4, the cluster generation circuitry 208 may use a distance metric, such as Euclidean distance or Manhattan distance, between a data point corresponding to the target user and a data point corresponding to the secondary user to generate the similarity score for the secondary user. Here, the data point corresponding to the target user may be based on the original feature set of the target user rather than the updated feature set.

As shown by operation 806, the apparatus 200 includes means, such as processor 202, memory 204, communications hardware 206, cluster generation circuitry 208, or the like, for determining a centroid distance shift for the target user. In some embodiments, the cluster generation circuitry 208 may be configured to determine a centroid feature set for each cluster. The centroid feature set may include one or more centroid features, which may be determined based on the mean or average of each feature value for users included in the corresponding cluster. As such, the centroid feature set may reflect the average feature values for the cluster. The cluster generation circuitry 208 may determine an original centroid distance for the target user based on a distance metric, such as Euclidean distance or Manhattan distance, between a data point corresponding to the target user based on the original feature set and a data point corresponding to the cluster centroid. Similarly, the cluster generation circuitry 208 may determine an updated centroid distance for the target user based on a distance metric, such as Euclidean distance or Manhattan distance, between a data point corresponding to the target user based on the updated feature set and a data point corresponding to the cluster centroid. The difference between the original centroid distance and updated centroid distance may then be used to determine the centroid distance shift. For example, the centroid distance shift may be conveyed using a corresponding graph coordinate system such as in the format of (x value, y value). A centroid distance shift of (−2, 10) may indicate that the target user shifted left by 2 units and up by 10 units relative to the cluster centroid, which reflects the change in coordinates determined for the target user relative to the cluster centroid.

As shown by operation 808, the apparatus 200 includes means, such as processor 202, memory 204, communications hardware 206, cluster generation circuitry 208, or the like, for determining a centroid distance for the secondary user. As described above, in some embodiments, the cluster generation circuitry 208 may be configured to determine a centroid feature set for each cluster. The cluster generation circuitry 208 may determine a centroid distance for the secondary user based on a distance metric, such as Euclidean distance or Manhattan distance, between a data point corresponding to the secondary user based on an associated feature set of the secondary user and a data point corresponding to the cluster centroid.

As shown by operation 810, the apparatus 200 includes means, such as processor 202, memory 204, communications hardware 206, prediction generation circuitry 210, or the like, for generating a predicted secondary effect for the secondary user. As described above, the prediction generation circuitry 210 may generate the predicted secondary effect for the secondary users using a secondary effect machine learning model. The secondary effect machine learning model may be provided the similarity score for the secondary user, a centroid distance shift score for the target user, and a centroid distance score for the secondary user and use this information to generate the predicted secondary effect for the secondary user. As described above, the secondary effect machine learning model may leverage an inferred similarity between the target user and the secondary user, as described by the similarity score, to determine a predicted centroid distance shift for the secondary user. The centroid distance shift may be a particular direction that is relative to the centroid of the cluster, and this direction may be indicated using the coordinate system, as described above. For example, a centroid distance shift of (1, -4) may indicate that the secondary user shifted right by 1 unit and down by 4 units relative to the cluster centroid in the coordinate system. The secondary effect machine learning model may also determine a relative degree of shift based on the centroid distance shift determined for the secondary user, and may generate the predicted secondary effect for the secondary user based on this relative degree of shift. For example, if the degree of shift for the user is relatively large, the predicted secondary effect may be generated as "highly affected". Furthermore, the direction of shift may indicate whether the predicted secondary effect corresponds to the predicted effect for the target user (e.g., is the same as) or does not correspond to (e.g., is the opposite of) the predicted effect for the target user. For example, a centroid distance shift for the target user may be determined to be (−2, 10), but the predicted centroid distance shift for the secondary user may be (1, −4), indicating the opposite effect for the secondary user such that the opposite predicted effect is determined for the secondary user as compared to the target user. For example, in an instance in which an "increase in digital transaction" predicted effect was determined for the target user, the secondary effect machine learning model may determine a "moderately affected decrease in digital transaction" predicted effect for the secondary user.

Returning now to FIG. 3, as shown by operation 312, the apparatus 200 includes means, such as processor 202, memory 204, communications hardware 206, or the like, for providing a predicted effect notification. Once apparatus 200 has determined a predicted effect for the target user, the apparatus 200 may generate a predicted effect notification that includes the predicted effect for the target user in response to the synthetic stimulus. In some embodiments, the predicted effect notification may also include an updated user feature set and/or one or more predicted feature changes for the target user. In some embodiments, the predicted effect notification may further include the predicted secondary effects determined for the one or more secondary users.

In some embodiments, the apparatus 200 may determine one or more recommendations to include in the predicted effect notification based on an analysis of the predicted effect and/or one or more secondary effects. In some embodiments, the apparatus 200 may determine one or more goals of the user associated with the synthetic behavior prediction request. The one or more goals of the user may be supplied in the synthetic behavior request or may be stored in an associated user profile such that apparatus 200 may determine the one or more goals for the user. The apparatus 200 may determine whether the one or more goals of the user correspond to the predicted effect for the target user and/or one or more secondary effects, and in an instance in which the goals do correspond to these predicted effects, the apparatus may determine a recommendation to pursue the synthetic stimulus. Alternatively, in an instance in which the goals do not correspond to these predicted effects, the apparatus may determine a recommendation to avoid this synthetic stimulus.

Figure 13A:
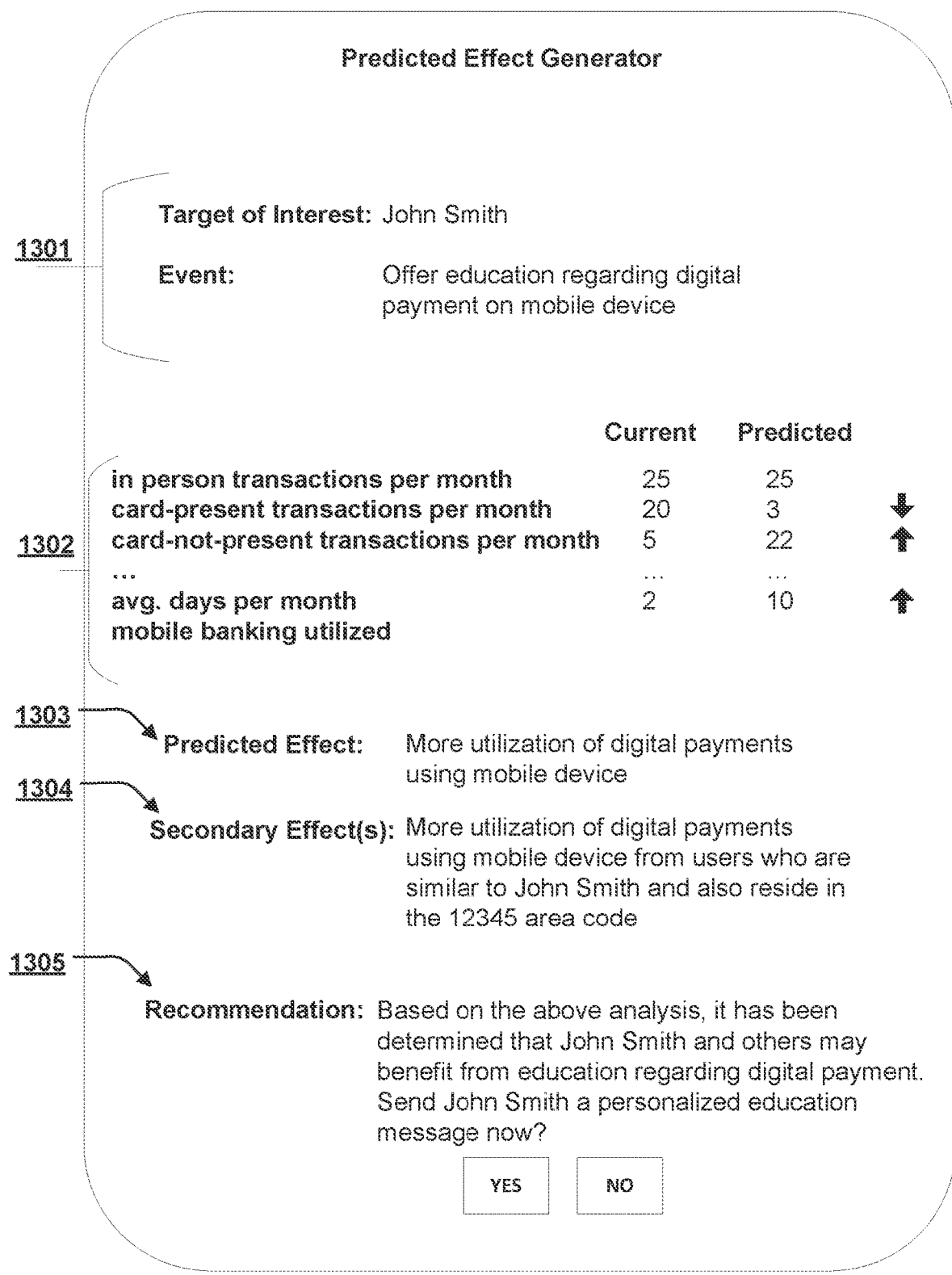
FIGS. 13A-13B illustrate operation examples of example user interfaces used in some example embodiments described herein.

FIG. 13A shows an example graphical user interface (GUI) that illustrates an example predicted effect notification. As noted previously, a user may interact with the predictive analytics system 102 by directly engaging with communications hardware 206 of an apparatus 200 comprising a system device of the predictive analytics system 102. In such an embodiment, the GUI shown in FIG. 13A may be displayed to a user by the apparatus 200. Alternatively, a user may interact with the predictive analytics system 102 using a separate user device (e.g., any of user devices 106A-106N, as shown in FIG. 1), which may communicate with the predictive analytics system 102 via communications network 104. In such an embodiment, the GUI shown in FIG. 13A may be displayed to the user by the corresponding user device.

As shown in FIG. 13A, information supplied by the synthetic behavior prediction request such as the target user and the synthetic event 1301 may be included in the predicted effect notification. Additionally, the predicted effect notification may include the associated feature values for both original feature set and updated feature set 1302. The predicted effect notification may additionally include the predicted effect for the target user 1303, and a summary of the one or more secondary effects predicted for one or more secondary users 1304. The predicted effect notification further includes a recommendation 1305 as well as associated user interaction options (e.g., "yes" or "no") such that a user may interact with these user interaction options to pursue the recommendation.

Optionally, as shown by operation 314, the apparatus 200 includes means, such as processor 202, memory 204, communications hardware 206, or the like, for causing one or more proactive actions to be executed. As described above, in some embodiments, the apparatus 200 may determine one or more recommendations based on an analysis of the predicted effect and/or one or more secondary effects and one or more goals of the user associated with the synthetic behavior prediction request. In some embodiments, the apparatus 200 may further determine one or more actions to take that correspond to the synthetic stimulus. For example, if the synthetic stimulus corresponds to generating educational material relating to digital payments, the apparatus 200 may use one or more machine learning models or may request one or more other devices to automatically generate and provide this educational material to the target user. As such, the apparatus 200 may take proactive action in response to determining that the synthetic stimulus would cause a predicted change in the target user and optionally, one or more secondary users which aligns with one or more user goals, and automatically execute one or more actions or associated operations to produce this synthetic stimulus.

Predicted Effect Operations for a Target Cluster

FIGS. 9-12 illustrate example flowcharts that contain example operations implemented by example embodiments described herein. In particular, the example operations shown by FIGS. 9-12 may be performed by the predictive analytics system 102 for a target cluster. The operations illustrated in FIGS. 9-12 may, for example, be performed by system device of the predictive analytics system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, cluster generation circuitry 208, prediction generation circuitry 210, and/or any combination thereof. It will be understood that user interaction with the predictive analytics system 102 may occur directly via communications hardware 206, or may instead be facilitated by a separate user device 106A-106N as shown in FIG. 1, and which may have similar or equivalent physical componentry facilitating such user interaction.

Figure 9:
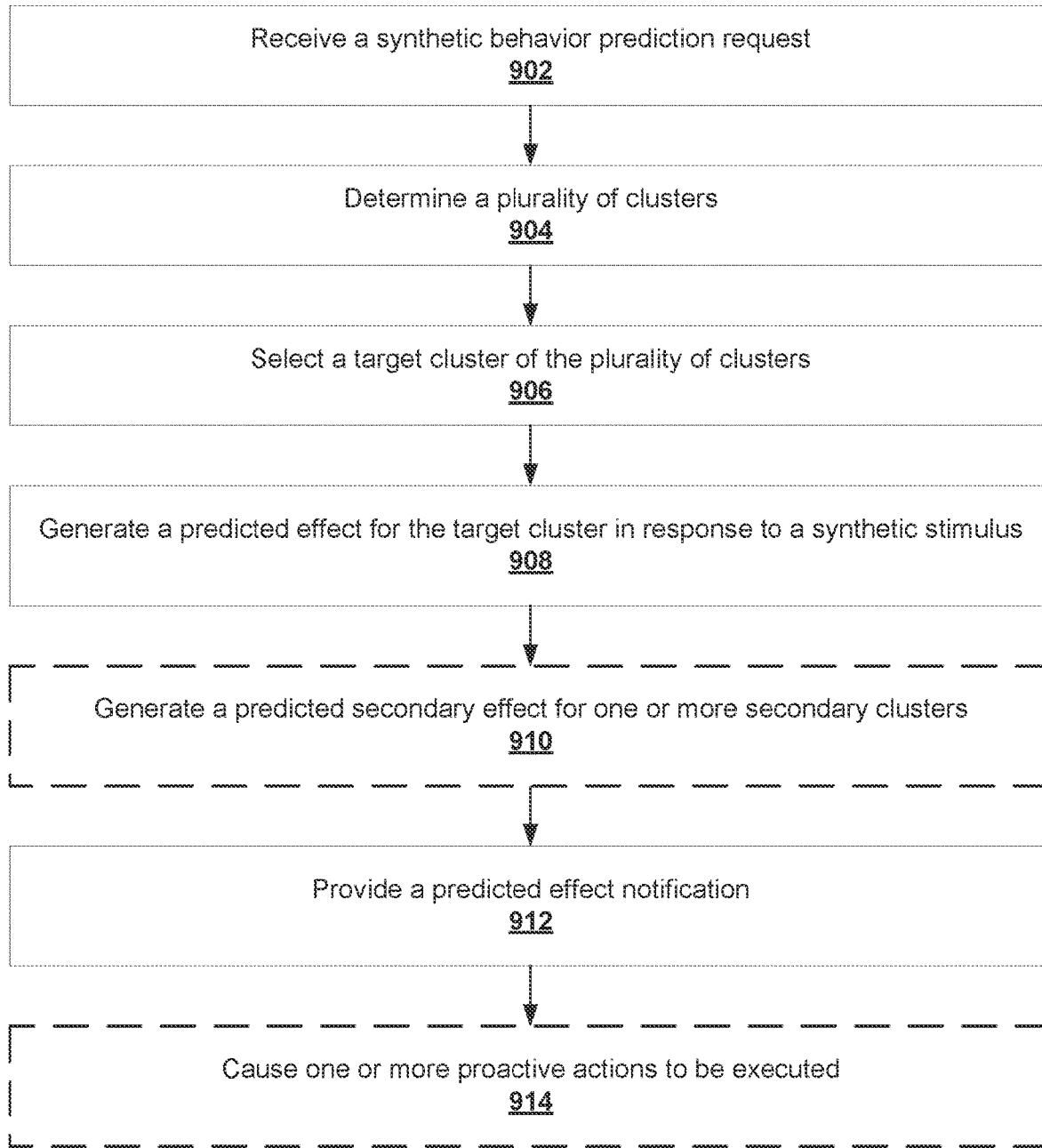
FIG. 9 illustrates an example flowchart for generating a predicted effected for a target cluster, in accordance with some example embodiments described herein.

Turning first to FIG. 9, example operations are shown for generating a predicted effect for a target cluster. In some embodiments, it may be advantageous to examine a predicted effect on a group of users rather than just an individual user. As such, the predictive analytics system 102 may generate a predicted effect for a target cluster in response to a synthetic stimulus using an associated centroid feature set. This allows the predictive analytics system 102 to determine predicted effects for groups of users at the cluster-level rather than at the individual level.

As shown by operation 902, the apparatus 200 includes means, such as processor 202, memory 204, communications hardware 206, or the like, for receiving a synthetic behavior prediction request. Similar to operation 302, the synthetic behavior prediction request may indicate a request by a user, such as a user associated with the predictive analytics system 102, to determine a predicted effect for a target user in response to a synthetic stimulus and may include authentication credentials of the requesting user such that apparatus 200 may authenticate the synthetic behavior prediction request using these provided credentials. Additionally, the synthetic behavior prediction request may also include an indication of a synthetic stimulus.

The synthetic behavior prediction request may include an indication of a target feature set. The target feature set may include one or more features and values that may be of interest to the user. For example, the synthetic behavior prediction request may include a particular location, occupation, salary range, behavior type, age range, gender type, user preferences type, purchase history type, user device information type, and/or the like of interest. The apparatus 200 may determine whether to generate a predicted effect for a target user or a target cluster based on whether the synthetic behavior prediction request includes an indication of a target user (e.g., indicative to generate a predicted effect for a target user) or an indication of a target feature set (e.g., indicative to generate a predicted effect for a target cluster).

As shown by operation 904, the apparatus 200 includes means, such as processor 202, memory 204, communications hardware 206, cluster generation circuitry 208 or the like, for determining a plurality of clusters. In some embodiments, the cluster generation circuitry 208 may determine one or more real world users and associated feature sets and/or one or more synthetic users and associated feature set and may determine the plurality of clusters, which include these real-world and/or synthetic users. In some embodiments, the cluster generation circuitry 208 may only use synthetic users when determining the plurality of clusters. In some embodiments, the cluster generation circuitry 208 may only use real-world users when determining the plurality of clusters.

In some embodiments, the cluster generation circuitry 208 may use a clustering model to determine the plurality of clusters. This clustering model may be the same clustering model as described in operation 308 of FIG. 3. The clustering model may use one or more clustering techniques and/or algorithms to determine the cluster for the target user and furthermore, for the plurality of users. In particular, the clustering model may use k-means clustering, DBSCAN algorithms, spectral clustering, or the like to determine these clusters and the users included in each cluster. In some embodiments, a number of clusters, k, may be input by a user and included by the synthetic behavior request or, alternatively, may be a parameter include in the clustering model. The clustering model may then cluster the real-world users and/or synthetic users into k clusters based on a comparison of similarities between features included in the associated feature sets of these users. Users that are associated with features that are determined to be similar to one another may be located more closely together as compared to users that are associated with features that are determined to be less similar to one another. Users within the same cluster may be determined to be associated with at least one similar feature. As such, the clustering model may determine an optimal grouping for users based on an inferred similarity of features between the users.

Figure 10:
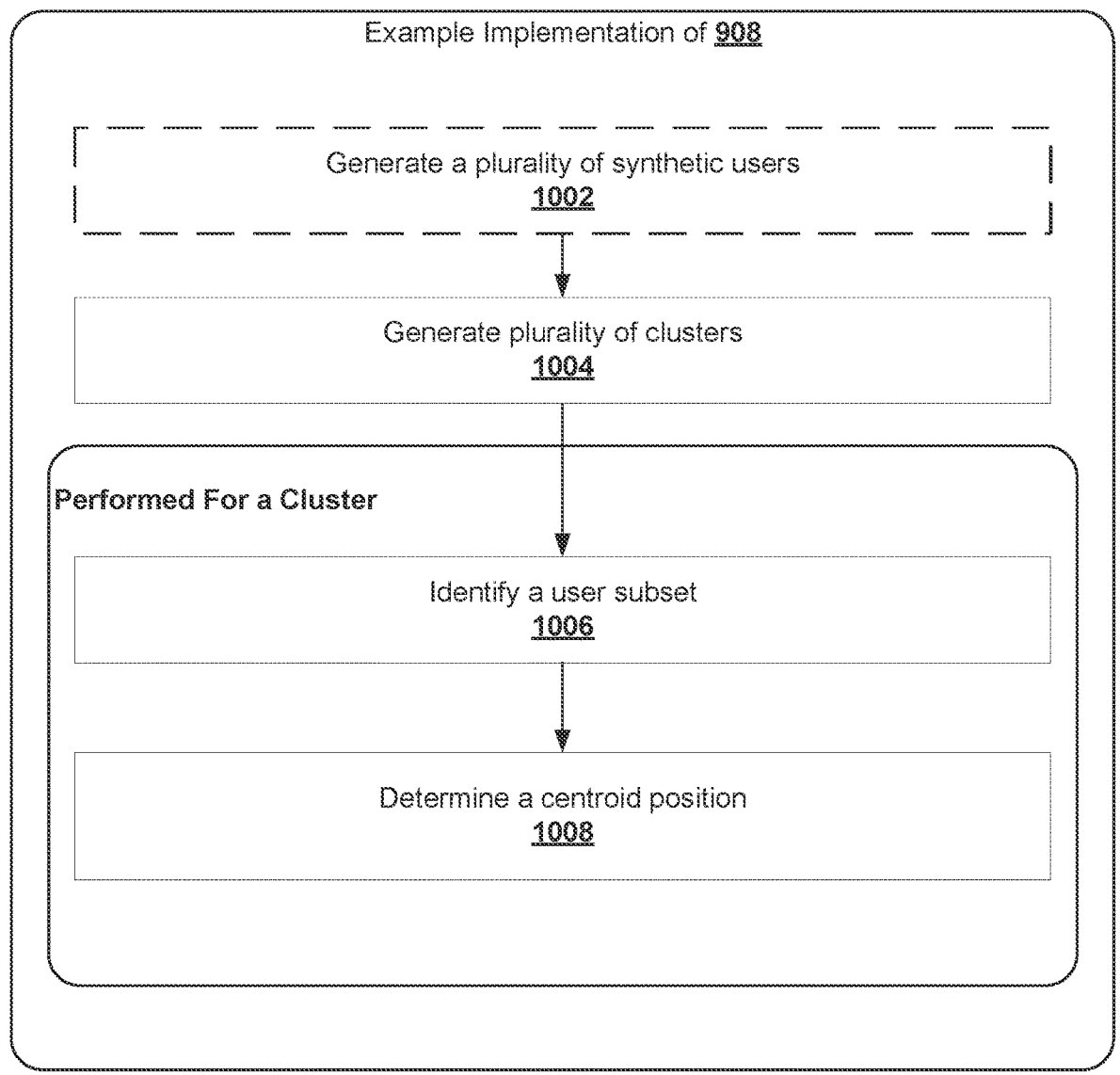
FIG. 10 illustrates an example flowchart for determining a centroid feature set for a target cluster, in accordance with some example embodiments described herein.

In some embodiments, operation 904 may be performed in accordance with the operations described by FIG. 10. Turning now to FIG. 10, example operations are shown for determining a plurality of clusters.

Optionally, as shown by operation 1002, the apparatus 200 includes means, such as processor 202, memory 204, communications hardware 206, cluster generation circuitry 208 or the like, for generating a plurality of synthetic users. In some embodiments, the apparatus 200 may determine to generate one or more synthetic users in addition to or in lieu of one or more real-world users. In some embodiments, the synthetic behavior request may indicate whether synthetic users are to be used, real-world users are to be used, or a combination thereof. In some embodiments, the cluster generation circuitry 208 may determine a count of real-world users and determine whether this count satisfies a mandatory count threshold. In an instance in which the cluster generation circuitry 208 determines the count of real-world users satisfies the mandatory count threshold, the cluster generation circuitry 208 may not generate synthetic users. However, in an instance in which the cluster generation circuitry 208 determines the count of real-world users fails to satisfy the mandatory count threshold, the cluster generation circuitry 208 may determine to generate synthetic users to bring the count of total users that includes real-world users and synthetic users, to a count which satisfies the mandatory count threshold.

In some embodiments, the cluster generation circuitry uses a synthetic user generation machine learning model to generate the plurality of synthetic users. As described above, the synthetic user generation machine learning model may be a GAN that is trained to generate features for the synthetic user that are similar to the features of the target user. In particular, a generator of the synthetic user generation machine learning model may generate candidate feature values for feature included in the feature set. A discriminator of the synthetic user generation machine learning model may then determine whether the candidate feature value is synthetic or real user data. In an instance in which the discriminator determines a candidate feature value is synthetic, the discriminator rejects the candidate feature value, and the generator produces a new candidate feature value until the discriminator determines a candidate feature value is real user data for the feature. In an instance in which the discriminator determines the candidate feature value is real user data, the candidate feature value may be appended as the feature value for the corresponding feature in the feature set for the synthetic user. This indicates that the synthetic feature value generated by the generator may be indistinguishable from real user data and thus, may be used as a feature value for the feature in the feature set for the synthetic user.

As shown by operation 1004, the apparatus 200 includes means, such as processor 202, memory 204, communications hardware 206, cluster generation circuitry 208 or the like, for generating the plurality of clusters. Once the users to be included in the clusters have been determined (e.g., real-world users and/or synthetic users), the cluster generation circuitry 208 may use a clustering model to determine the plurality of clusters for the users. In some embodiments, the clustering model may use one or more clustering techniques and/or algorithms to determine the clusters for the plurality of users. In particular, the clustering model may use k-means clustering, DBSCAN algorithms, spectral clustering, or the like to determine these clusters and the users included in each cluster, as described above in operation 904.

As shown by operation 1006, the apparatus 200 includes means, such as processor 202, memory 204, communications hardware 206, cluster generation circuitry 208 or the like, for identifying a user subset for a cluster. Once the plurality of clusters has been determined, the cluster generation circuitry 208 may determine a user subset for a cluster. The user subset may include users who are classified or determined to be within the particular cluster.

As shown by operation 1008, the apparatus 200 includes means, such as processor 202, memory 204, communications hardware 206, cluster generation circuitry 208 or the like, for determining a centroid position for the cluster. Once the cluster generation circuitry 208 identifies the users included in the cluster, the cluster generation circuitry 208 may determine a centroid value for the cluster based on a position of each user included in the centroid. For example, the cluster generation circuitry 208 may determine the position (e.g., coordinates) of each identified user within the cluster, sum each respective coordinate for the users, and divide by the total number of users to determine a coordinate for the centroid value for the cluster. For example, the cluster may be associated with three users, who may be positioned at coordinates (1, 4), (2, 5), and (3, 6), respectively. The cluster generation circuitry 208 may then determine a first coordinate of 2 and a second coordinate of 5 such that the centroid position may be determined to be (2, 5). The centroid position may be representative of the data included within the particular cluster as a whole.

Returning now to FIG. 9, as shown by operation 906, the apparatus 200 includes means, such as processor 202, memory 204, communications hardware 206, cluster generation circuitry 208 or the like, for selecting a target cluster from the plurality of clusters. The cluster generation circuitry 208 may select the target cluster based on the target feature set included in the synthetic behavior request. In some embodiments, the cluster generation circuitry 208 may identify a cluster which most closely matches the feature values included in the target feature set. The cluster that is most closely associated with the feature values of the target feature set may be selected by the cluster generation circuitry as the target cluster.

In some embodiments, the cluster generation circuitry 208 may generate a temporary user that is associated with a temporary feature set that is determined based on the target feature set. The cluster generation circuitry 208 may identify a cluster for a temporary user based on the temporary feature set and select the corresponding cluster as the target cluster. Once the target cluster has been selected, the cluster generation circuitry 208 may remove the temporary user from the cluster.

As shown by operation 908, the apparatus 200 includes means, such as processor 202, memory 204, communications hardware 206, prediction generation circuitry 210 or the like, for generating a predicted effect for the target cluster in response to the synthetic stimulus. In some embodiments, the predicted effect for the target cluster may be associated with an updated centroid position for the target cluster. In some embodiments, the prediction generation circuitry 210 may use a cluster stimulus prediction machine learning model to generate the updated centroid position for the target cluster in response to the synthetic stimulus. In some embodiments, the cluster stimulus prediction machine learning model is a data model that is configured to describe parameters, hyper-parameters, and/or stored operations of a machine learning model that is configured to process a centroid position for a target cluster and the synthetic stimulus to generate the updated centroid position and/or a predicted effect for the target cluster. In some embodiments, the cluster stimulus prediction machine learning model may be a neural network that is trained to analyze the relationship between an event (e.g., stimulus) and centroid location data to determine the predicted effect for the target cluster. In some embodiments, the cluster stimulus prediction machine learning model may be trained based on historical user behavior data in response to other stimuli.

In some embodiments, the cluster stimulus prediction machine learning model may additionally receive the count of users and associated user position within the target cluster for users associated with the target cluster such that the cluster stimulus prediction machine learning model may consider how representative the centroid position of the cluster is when determining an updated centroid position. For example, in an instance in which the target cluster includes 10 (ten) users with widely varying user positions, the cluster stimulus prediction machine learning model may determine a smaller shift in the updated centroid position as compared to a target cluster that includes 10 (ten) users that are proximate to one another. In some embodiments, the cluster stimulus prediction machine learning model may further be configured to classify the target cluster into one or more effect categories based on the updated centroid position. The cluster stimulus prediction machine learning model may also infer which features are most influential to this position shift and then identify these features and influenced features as well as a type of influence (e.g., positive, negative). For example, if the updated centroid position for a target cluster indicates a shift to the northwest, this may correspond to an increase in the number of card-not-present transactions (e.g., a positive influence on a card-not present transaction feature). As such, the cluster stimulus prediction machine learning model may categorize the target cluster into a "digital transaction increase" effect category. The classification of the target cluster into predicted event categories is described in more detail with respect to FIG. 11.

Figure 11:
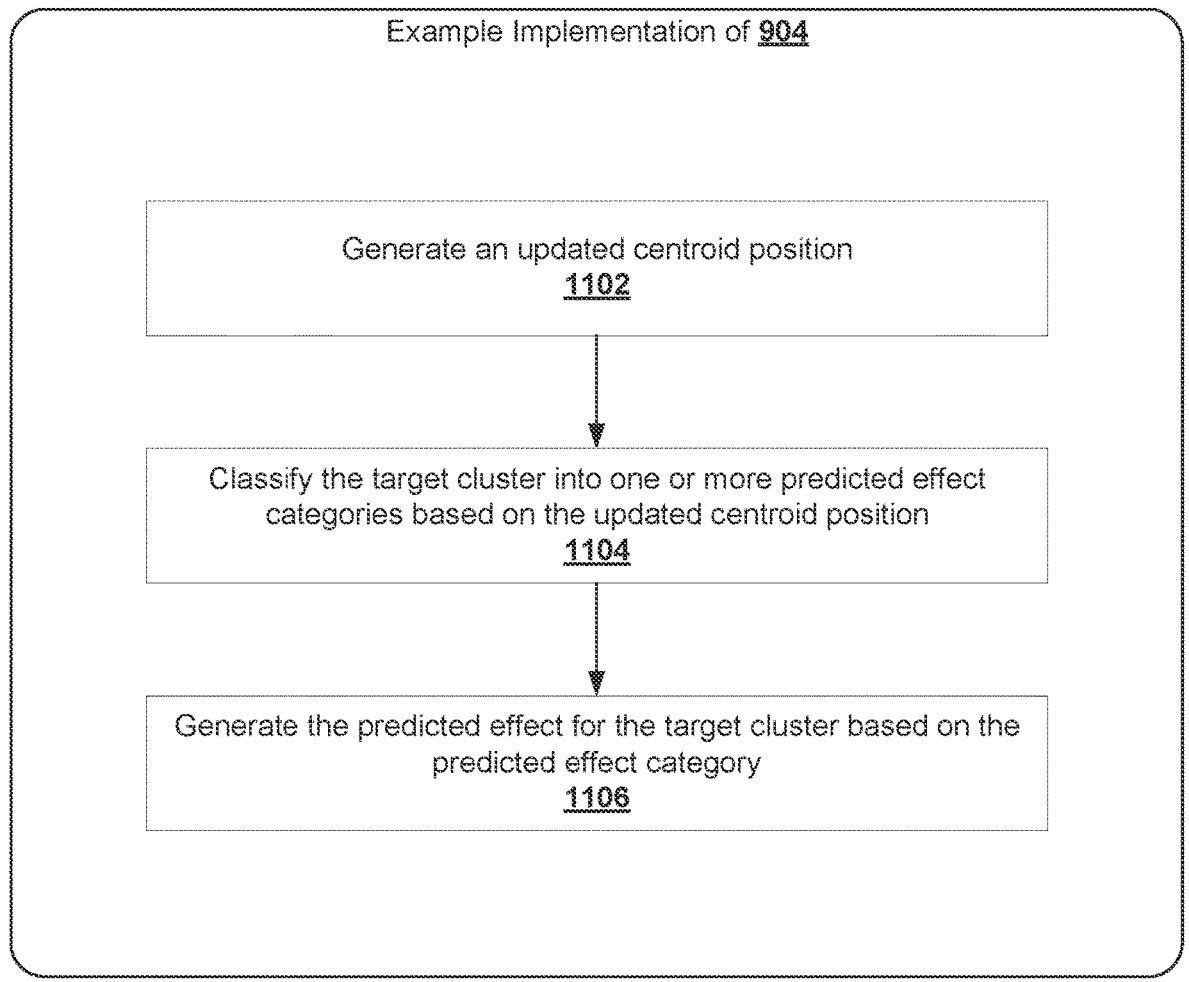
FIG. 11 illustrates an example flowchart for generating a predicted effect for a target cluster based on a predicted effect category, in accordance with some example embodiments described herein.

In some embodiments, operation 904 may be performed in accordance with the operations described by FIG. 11. Turning now to FIG. 11, example operations are shown for generating a predicted effect for the target cluster based on a predicted effect category.

As shown by operation 1102, the apparatus 200 includes means, such as processor 202, memory 204, communications hardware 206, prediction generation circuitry 210 or the like, for generating an updated centroid position associated with the target cluster. As described above, the prediction generation circuitry 210 may generate an updated centroid feature set for the target cluster using the cluster stimulus prediction machine learning model. The cluster stimulus prediction machine learning model may be configured to generate the updated centroid position based on an inferred direction and magnitude of change for the centroid position of the target cluster. In some embodiments, the cluster stimulus prediction machine learning model may additionally receive the count of users and associated user position within the target cluster for users associated with the target cluster such that the cluster stimulus prediction machine learning model may consider how representative the centroid position of the cluster is when determining an updated centroid position. For example, in an instance in which the target cluster includes ten users with widely varying user positions, the cluster stimulus prediction machine learning model may determine a smaller shift in the updated centroid position as compared to a target cluster that includes ten users that are proximate to one another.

As shown by operation 1104, the apparatus 200 includes means, such as processor 202, memory 204, communications hardware 206, prediction generation circuitry 210 or the like, for classifying the target cluster into one or more predicted effect categories based on the updated centroid feature set. In some embodiments, the cluster stimulus prediction model may be configured with a plurality of predicted effect categories. These predicted effect categories may be associated with a set of criteria which the updated centroid position needs to satisfy in order to qualify for the predicted effect category. Additionally, a predicted effect category may correspond to a particular predicted effect. The cluster stimulus prediction machine learning model may classify the target cluster into one or more predicted effect categories based on which criteria the updated centroid position and/or determined influenced features satisfies. For example, a "digital transaction increase" predicted effect category may require that a number of digital transactions is identified as an influenced feature and is determined to have a positive or increasing effect. In an instance in which the updated centroid position and/or determined influenced feature associated with the target cluster indicates an overall number of digital transactions increased, the cluster stimulus prediction machine learning model may classify the target cluster into the "digital transaction increase" category, which may be associated with an "increase in digital transaction" predicted effect.

As shown by operation 1106, the apparatus 200 includes means, such as processor 202, memory 204, communications hardware 206, prediction generation circuitry 210 or the like, for generating the predicted effect for the target cluster based on the predicted effect category. As described above, each predicted effect category may be associated with a predicted effect. As such, the cluster stimulus prediction machine learning model may generate the predicted effect for the target cluster based on which predicted effect categories the target cluster satisfied (e.g., was classified into) and the associated predicted effect for each of these predicted effect categories.

Returning to FIG. 9, optionally, as shown by operation 910, the apparatus 200 includes means, such as processor 202, memory 204, communications hardware 206, prediction generation circuitry 210 or the like, for generating a predicted secondary effect for one or more secondary clusters. As mentioned above, in some examples, a predicted effect determined for the target cluster may have far-reaching effects and may affect other secondary clusters. In some embodiments, the cluster generation circuitry 208 may leverage the clustering determined in operation 904 to identify one or more secondary clusters of interest and determine one or more secondary effects inferred to be caused by the predicted effect determined for the target cluster in response to the synthetic stimulus.

In some embodiments, the prediction generation circuitry 210 may use a cluster secondary effect machine learning model to generate a predicted secondary effect for a secondary cluster. In some embodiments, the cluster secondary effect machine learning model is a data model that is configured to describe parameters, hyper-parameters, and/or stored operations of a machine learning model that is configured to process a similarity score for a secondary cluster to generate a predicted secondary effect for the secondary cluster. The cluster secondary effect machine learning model may determine an inferred correlation between a shift of the updated centroid position relative to the original centroid position of the target cluster. This shift may be determined to be attributed to the synthetic stimulus. The similarity score determined for the secondary cluster may be indicative of a similarity between the secondary cluster and the target cluster based on the associated users.

The cluster secondary effect machine learning model may then leverage the inferred similarity between the target cluster and the secondary cluster as described by the similarity score to determine an updated centroid position for the secondary cluster. For example, if the target cluster and secondary cluster are very similar and thus proximate to one another, the cluster secondary effect machine learning model may infer that the secondary cluster may experience a centroid shift to a new updated centroid position, similar to that of the target cluster. A centroid distance shift may be a particular direction that is relative to the original centroid position of the secondary cluster. The cluster secondary effect machine learning model may then determine a relative degree of shift based on the updated centroid position determined for the secondary cluster and generate the predicted secondary effect for the secondary cluster based on this relative degree of shift. For example, if the degree of shift for the cluster is relatively large, the predicted secondary effect may be generated as "highly affected". Furthermore, the direction of shift may also indicate whether the predicted secondary effect corresponds to the predicted effect for the cluster (e.g., is the same as) or does not correspond to (e.g., is the opposite of) the predicted effect for the cluster. For example, an updated centroid position for the cluster may move the centroid of the cluster northwest but updated centroid position for the secondary cluster may be southeast, indicating the opposite effect for the secondary cluster such that the opposite predicted effect is determined for the secondary cluster as compared to the target cluster. As such, the cluster secondary effect machine learning model may determine the predicted secondary effect for the secondary cluster based on the degree of shift of the secondary user cluster centroid position as well as the direction of shift.

Figure 12:
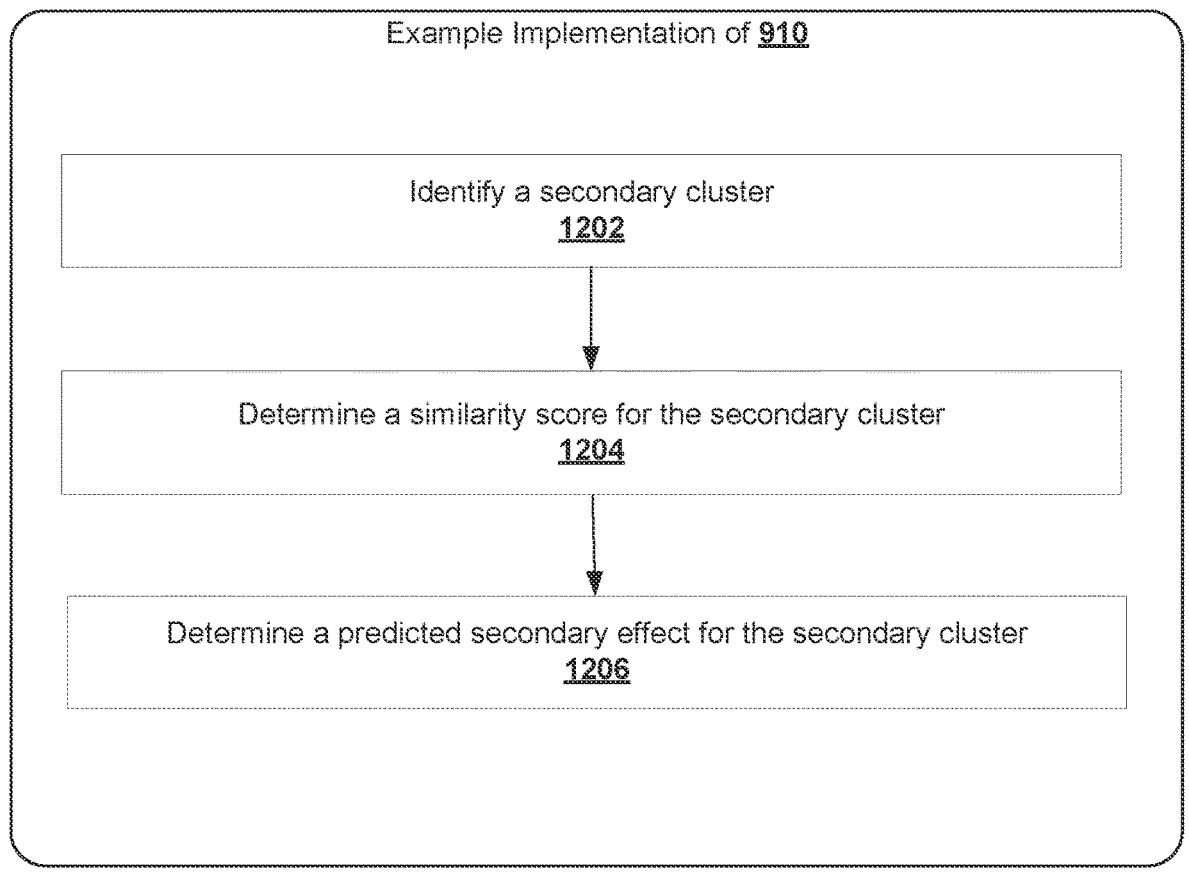
FIG. 12 illustrates an example flowchart for generating a predicted secondary effect for one or more secondary clusters, in accordance with some example embodiments described herein.

In some embodiments, operation 910 may be performed in accordance with the operations described by FIG. 12. Turning now to FIG. 12, example operations are shown for generating a predicted secondary effect for a secondary cluster. The operations described by FIG. 12 may be repeated for each secondary cluster included in the one or more secondary clusters to determine a predicted secondary effect for the corresponding secondary cluster.

As shown by operation 1202, the apparatus 200 includes means, such as processor 202, memory 204, communications hardware 206, cluster generation circuitry 208, or the like, for identifying a secondary cluster of interest. In some embodiments, any cluster may be identified by the cluster generation circuitry 208 as a secondary cluster. The cluster generation circuitry 208 may evaluate each identified secondary user in any particular order.

As shown by operation 1204, the apparatus 200 includes means, such as processor 202, memory 204, communications hardware 206, cluster generation circuitry 208, or the like, for determining a similarity score for the secondary cluster. Similar to operation 402 of FIG. 4 and operation 802 of FIG. 8, the cluster generation circuitry 208 may use a distance metric, such as Euclidean distance or Manhattan distance, between an original centroid position (e.g., the centroid position before the updated) of the target cluster and an original centroid position of the secondary cluster to generate the similarity score for the secondary cluster.

As shown by operation 1206, the apparatus 200 includes means, such as processor 202, memory 204, communications hardware 206, cluster generation circuitry 208, or the like, for determining a predicted secondary effect for the secondary cluster. As described above, the prediction generation circuitry 210 may generate the predicted secondary effect for the secondary clusters using a cluster secondary effect machine learning model. The cluster secondary effect machine learning model may be provided the similarity score for the secondary cluster, a centroid position for the secondary cluster, a centroid position for the target cluster and/or an updated centroid position for the target cluster and use this information to generate the predicted secondary effect for the secondary cluster. As described above, the cluster secondary effect machine learning model may leverage an inferred similarity between the target cluster and the secondary cluster as described by the similarity score to determine a predicted updated centroid position for the secondary cluster. An associated shift for the centroid position may be a particular direction that may be indicated using the coordinate system, as described above. For example, a centroid distance shift of (1, −4) may indicate that the centroid of the secondary cluster shifted right by 1 unit and down by 4 units relative to the original centroid position of the secondary cluster. The secondary effect machine learning model may also determine a relative degree of shift based on the centroid distance shift determined for the secondary cluster and generate the predicted secondary effect for the secondary user based on this relative degree of shift. For example, if the degree of shift for the cluster is relatively large, the predicted secondary effect may be generated as "highly affected". Furthermore, the direction of shift may indicate whether the predicted secondary effect corresponds to the predicted effect for the cluster (e.g., is the same as) or does not correspond to (e.g., is the opposite of) the predicted effect for the cluster. For example, a centroid distance shift for the cluster may be determined to be (−2, 10) but the predicted centroid distance shift for the secondary cluster may be (1, −4), indicating the opposite effect for the secondary cluster such that the opposite predicted effect is determined for the secondary user as compared to the target user. For example, in an instance in which an "increase in digital transaction" predicted effect was determined for the cluster, the cluster secondary effect machine learning model may determine a "moderately affected decrease in digital transaction" predicted effect for the secondary cluster.

Returning now to FIG. 9, as shown by operation 912, the apparatus 200 includes means, such as processor 202, memory 204, communications hardware 206, or the like, for providing a predicted effect notification. Once apparatus 200 has determined a predicted effect for the target cluster, the apparatus 200 may generate a predicted effect notification that includes the predicted effect for the target cluster in response to the synthetic stimulus. In some embodiments, the predicted effect notification may also include an updated centroid position and/or one or more determined influenced features. In some embodiments, the predicted effect notification may further include the predicted secondary effects determined for the one or more secondary clusters.

In some embodiments, the apparatus 200 may determine one or more recommendations to include in the predicted effect notification based on an analysis of the predicted effect and/or one or more secondary effects. In some embodiments, the apparatus 200 may determine one or more goals of the user associated with the synthetic behavior prediction request. The one or more goals of the user may be supplied in the synthetic behavior request or may be stored in an associated user profile such that apparatus 200 may determine the one or more goals for the user. The apparatus 200 may determine whether the one or more goals of the user correspond to the predicted effect for the target cluster and/or one or more secondary effects and in an instance in which the goals do correspond to these predicted effects, the apparatus may determine a recommendation to pursue the synthetic stimulus. Alternatively, in an instance in which the goals do not correspond to these predicted effects, the apparatus may determine a recommendation to avoid this synthetic stimulus.

Figure 13B:
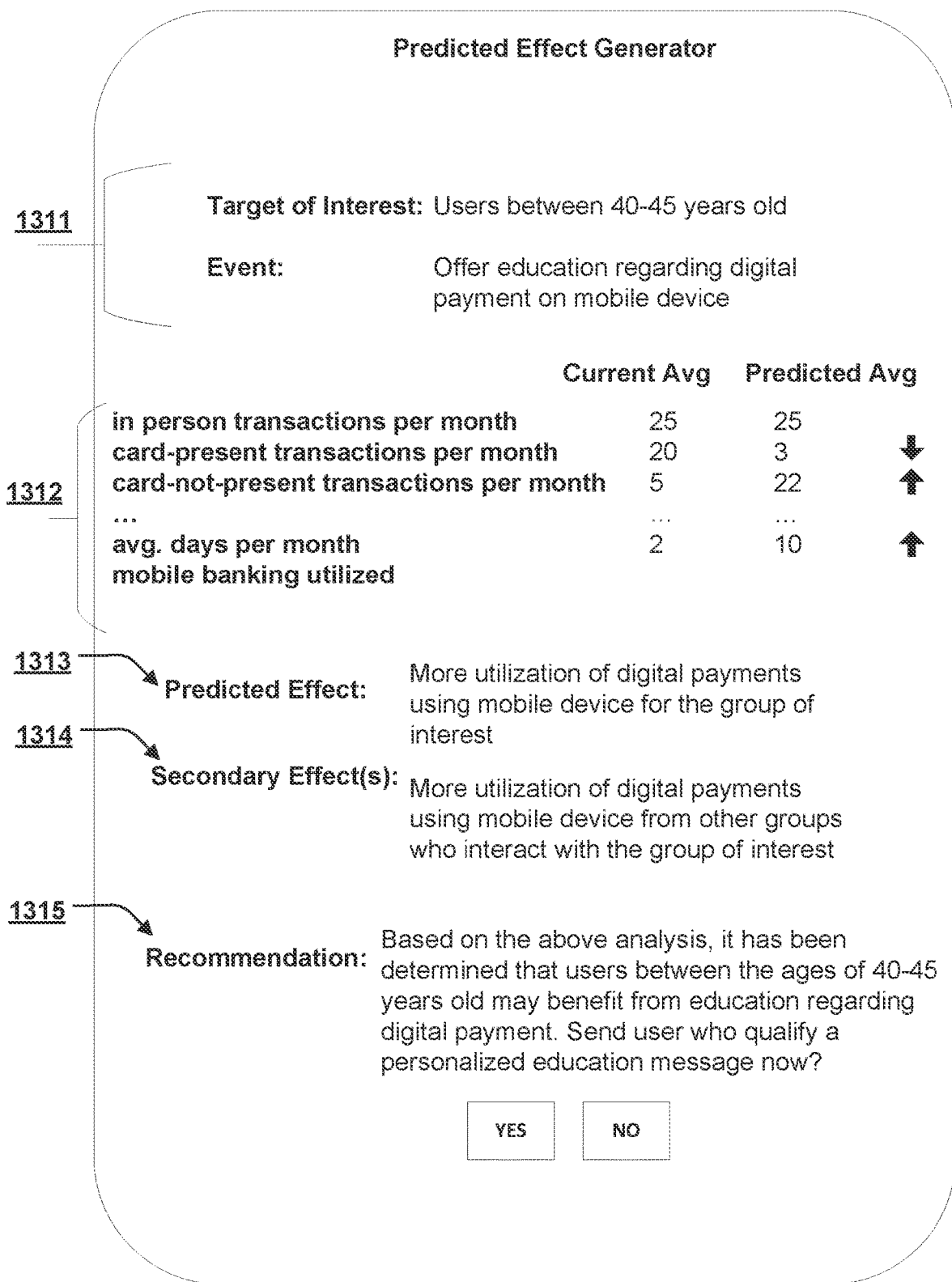

FIG. 13B shows an example graphical user interface (GUI) is provided that illustrates an example predicted effect notification. As noted previously, a user may interact with the predictive analytics system 102 by directly engaging with communications hardware 206 of an apparatus 200 comprising a system device of the predictive analytics system 102. In such an embodiment, the GUI shown in FIG. 13A may be displayed to a user by the apparatus 200. Alternatively, a user may interact with the predictive analytics system 102 using a separate user device (e.g., any of user devices 106A-106N, as shown in FIG. 1), which may communicate with the predictive analytics system 102 via communications network 104. In such an embodiment, the GUI shown in FIG. 13A may be displayed to the user by the corresponding user device.

As shown in FIG. 13B, information supplied by the synthetic behavior prediction request such as the target feature set (e.g., target of interest) and the synthetic event 1311 may be included in the predicted effect notification. Additionally, the predicted effect notification may include the associated influenced features 1312. The predicted effect notification may additionally include the predicted effect for the target cluster 1313 and a summary of the one or more secondary effects predicted for one or more secondary clusters 1314. The predicted effect notification further includes a recommendation 1315 as well as associated user interaction options (e.g., "yes" or "no") such that a user may interact with these user interaction options to pursue the recommendation.

Optionally, as shown by operation 914, the apparatus 200 includes means, such as processor 202, memory 204, communications hardware 206, or the like, for causing one or more proactive actions to be executed. As described above, in some embodiments, the apparatus 200 may determine one or more recommendations based on an analysis of the predicted effect and/or one or more secondary effects and one or more goals of the user associated with the synthetic behavior prediction request. In some embodiments, the apparatus 200 may further determine one or more actions to take that correspond to the synthetic stimulus. For example, if the synthetic stimulus corresponds to generating educational material relating to digital payments, the apparatus 200 may use one or more machine learning models or may request one or more other devices to automatically generate and provide this educational material to the user who fit the target of interest as determined based on the target feature set. As such, the apparatus 200 may take proactive action in response to determining that the synthetic stimulus would cause a predicted change in the target user group and optionally, one or more secondary users which aligns with one or more user goals, and automatically execute one or more actions or associated operations to produce this synthetic stimulus.

FIGS. 3-12 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved techniques for predicting effects in response to a synthetic stimulus. Example embodiments thus provide tools that overcome the problems faced by conventional techniques, which are limited to retroactive analysis of user behavior and attribution of changes in behavior to certain stimuli. By proactively identifying these predicted effect, proactive actions may be taken based on the predicted effect, thus enabling real-time intervention for users to alter outcomes or effects before they occur.

As these examples all illustrate, example embodiments contemplated herein provide technical solutions that solve real-world problems faced during cause-and-effect analyses. In particular, embodiments described herein contemplate evaluation of predicted effects in response to a synthetic stimulus at an individual user level and group level (e.g., cluster-level) and therefore provide robust techniques that may allow for accurate predicted effects to be determined for a variety of use cases. Additionally, as discussed above, embodiments described herein allow for the contemplation of generating predicted secondary effects for secondary users and/or groups of users (e.g., clusters), thereby allowing for predictions of far-reaching effects for which the predicted effect was the catalyst.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating a predicted effect for a target cluster in response to a synthetic stimulus, the method comprising:
   receiving, by communications hardware, a synthetic behavior prediction request, wherein the synthetic behavior prediction request comprises (i) an indication of the synthetic stimulus and (ii) a target feature set;
   generating, by cluster generation circuitry, a plurality of clusters, wherein each cluster is associated with a corresponding centroid position;
   selecting, by prediction generation circuitry based on the target feature set, the target cluster from the plurality of clusters, wherein (a) the target cluster comprises one or more users and (b) each of the one or more users is associated with a feature set;
   generating, by the prediction generation circuitry and using a stimulus prediction machine learning model, an updated feature set for each of the one or more users in response to the synthetic stimulus;
   generating, by the cluster generation circuitry and based on the updated feature set for each of the one or more users, an updated centroid position for the target cluster;
   generating, by the prediction generation circuitry and based on the updated centroid position corresponding to the target cluster, the predicted effect for the target cluster; and
   providing, by the communications hardware, a predicted effect notification, wherein the predicted effect notification comprises the predicted effect for the target cluster.

2. The method of claim 1, further comprising:
   selecting, by the prediction generation circuitry, a secondary cluster from the plurality of clusters;
   determining, by the cluster generation circuitry, a similarity score for the secondary cluster, wherein the similarity score is determined based on a centroid position associated with the secondary cluster and the centroid position associated with the target cluster; and
   generating, by the prediction generation circuitry and based on the similarity score and the updated centroid position, a predicted secondary effect for the secondary cluster, wherein the predicted effect notification further comprises the predicted secondary effect.

3. The method of claim 1, further comprising:
   generating, by the cluster generation circuitry, a plurality of synthetic users, wherein each synthetic user is associated with a feature set and each feature set comprises one or more features, wherein determining the plurality of clusters includes analyzing the plurality of synthetic users.

4. The method of claim 1, further comprising, for each cluster:
identifying, by the cluster generation circuitry, a user subset comprising users included in a cluster; and
determining, by the cluster generation circuitry and based on the user subset, the corresponding centroid position for each cluster.

5. The method of claim 1, further comprising:
classifying, by the prediction generation circuitry and based on the updated centroid position, the target cluster into one or more predicted effect categories, wherein each predicted effect category is associated with a predicted effect.

6. The method of claim 1, further comprising, for a target user within the target cluster:
identifying, by the cluster generation circuitry and based on a feature set associated with the user, a digital twin for the user; and
generating, by the prediction generation circuitry and based on the synthetic stimulus and a feature set associated with the digital twin, an updated feature set associated with the target user.

7. The method of claim 6, wherein the digital twin is associated with a stimulus corresponding to the synthetic stimulus.

8. An apparatus for generating a predicted effect for a target cluster in response to a synthetic stimulus, the apparatus comprising:
communications hardware configured to:
receive a synthetic behavior prediction request, wherein the synthetic behavior prediction request comprises (i) an indication of the synthetic stimulus and (ii) a target feature set;
cluster generation circuitry configured to:
generate a plurality of clusters, wherein each cluster is associated with a corresponding centroid position; and
prediction generation circuitry configured to:
select, based on the target feature set, the target cluster from the plurality of clusters, wherein (a) the target cluster comprises one or more users and (b) each of the one or more users is associated with a feature set,
generate, using a stimulus prediction machine learning model, an updated feature set for each of the one or more users in response to the synthetic stimulus,
wherein the cluster generation circuitry is further configured to generate, based on the updated feature set for each of the one or more users, an updated centroid position for the target cluster,
wherein the prediction generation circuitry is further configured to generate, based on the updated centroid position corresponding to the target cluster, the predicted effect for the target cluster,
wherein the communications hardware is further configured to provide a predicted effect notification, wherein the predicted effect notification comprises the predicted effect for the target cluster.

9. The apparatus of claim 8, wherein the prediction generation circuitry is further configured to select a secondary cluster from the plurality of clusters,
wherein the cluster generation circuitry is further configured to determine a similarity score for the secondary cluster, wherein the similarity score is determined based on a centroid position associated with the secondary cluster and the centroid position associated with the target cluster,
wherein the prediction generation circuitry is further configured to generate, based on the similarity score and the updated centroid position, a predicted secondary effect for the secondary cluster, wherein the predicted effect notification further comprises the predicted secondary effect.

10. The apparatus of claim 8, wherein the cluster generation circuitry is further configured to generate a plurality of synthetic users, wherein each synthetic user is associated with a feature set and each feature set comprises one or more features,
wherein determining the plurality of clusters includes analyzing the plurality of synthetic users.

11. The apparatus of claim 8, wherein the cluster generation circuitry is further configured to, for each cluster:
identify a user subset comprising users included in a cluster; and
determine, based on the user subset, the corresponding centroid position for each cluster.

12. The apparatus of claim 8 wherein the prediction generation circuitry is further configured to:
classify, based on the updated centroid position, the target cluster into one or more predicted effect categories, wherein each predicted effect category is associated with a predicted effect.

13. The apparatus of claim 8, wherein, the cluster generation circuitry is further configured to for a target user within the target cluster, identify, based on a feature set associated with the user, a digital twin for the user,
wherein the prediction generation circuitry is further configured to generate, based on the synthetic stimulus and a feature set associated with the digital twin, an updated feature set associated with the target user.

14. The apparatus of claim 13, wherein the digital twin is associated with a stimulus corresponding to the synthetic stimulus.

15. A computer program product for generating a predicted effect for a target cluster in response to a synthetic stimulus, the computer program product comprising at least one non-transitory computer-readable storage medium storing software instructions that, when executed, cause an apparatus to:
receive a synthetic behavior prediction request, wherein the synthetic behavior prediction request comprises (i) an indication of the synthetic stimulus and (ii) a target feature set;
generate a plurality of clusters, wherein each cluster is associated with a corresponding centroid position;
select, based on the target feature set, the target cluster from the plurality of clusters, wherein (a) the target cluster comprises one or more users and (b) each of the one or more users is associated with a feature set;
generate, using a stimulus prediction machine learning model, an updated feature set for each of the one or more users in response to the synthetic stimulus:
generate, based on the updated feature set for each of the one or more users, an updated centroid position for the target cluster:
generate, based on the updated centroid position corresponding to the target cluster, the predicted effect for the target cluster; and
provide a predicted effect notification, wherein the predicted effect notification comprises the predicted effect for the target cluster.

16. The computer program product of claim 15, wherein the software instructions, when executed, further cause the apparatus to:
- select a secondary cluster from the plurality of clusters;
- determine a similarity score for the secondary cluster, wherein the similarity score is determined based on a centroid position associated with the secondary cluster and the centroid position associated with the target cluster; and
- generate, based on the similarity score and the updated centroid position, a predicted secondary effect for the secondary cluster, wherein the predicted effect notification further comprises the predicted secondary effect.

17. The computer program product of claim 15, wherein the software instructions, when executed, further cause the apparatus to:
- generate a plurality of synthetic users, wherein each synthetic user is associated with a feature set and each feature set comprises one or more features,
- wherein determining the plurality of clusters includes analyzing the plurality of synthetic users.

18. The computer program product of claim 15, wherein the software instructions, when executed, further cause the apparatus to, for each cluster:
- identify a user subset comprising users included in a cluster; and
- determine, based on the user subset, the corresponding centroid position for each cluster.

19. The computer program product of claim 15, wherein the software instructions, when executed, further cause the apparatus to, for a target user within the target cluster:
- identify, based on a feature set associated with the user, a digital twin for the user; and
- generate, based on the synthetic stimulus and a feature set associated with the digital twin, an updated feature set associated with the target user.

20. The computer program product of claim 19, wherein the digital twin is associated with a stimulus corresponding to the synthetic stimulus.

\* \* \* \* \*